(12) United States Patent
Tsukagoshi et al.

(10) Patent No.: US 6,283,654 B1
(45) Date of Patent: Sep. 4, 2001

(54) IMAGE-FORMING METHOD AND DEVICE AND ELECTRONIC APPARATUS INCORPORATING THE DEVICE

(75) Inventors: Shinichi Tsukagoshi, Shiojiri; Kenji Watanabe, Tokyo; Tomoyuki Ichikawa, Tokyo; Takuya Suetani, Tokyo; Tomoyuki Shinmura, Tokyo-to, all of (JP)

(73) Assignees: Seiko Epson Corporation; King Jim Co., Ltd., both of Tokyo (JP)

( * ) Notice: Subject to any disclaimer, the term of this patent is extended or adjusted under 35 U.S.C. 154(b) by 0 days.

(21) Appl. No.: 09/248,778

(22) Filed: Feb. 12, 1999

(30) Foreign Application Priority Data

Feb. 17, 1998 (JP) .................................................. 10-051529
Feb. 17, 1998 (JP) .................................................. 10-051530
Feb. 17, 1998 (JP) .................................................. 10-051531
Feb. 17, 1998 (JP) .................................................. 10-051532

(51) Int. Cl.⁷ .............................. B41J 15/16; B41J 11/44; B41J 3/42; B41J 9/44
(52) U.S. Cl. .......................... 400/615.2; 400/76; 400/70; 400/61
(58) Field of Search .................. 400/615.2, 76, 400/70, 61

(56) References Cited

U.S. PATENT DOCUMENTS

| 4,843,570 | * | 6/1989 | Sugitani | 364/518 |
| 4,850,726 | * | 7/1989 | Kimura et al. | 400/279 |
| 4,980,841 | * | 12/1990 | Sugitani | 364/518 |

FOREIGN PATENT DOCUMENTS

| 62-231378 | | 10/1987 | (JP) . |
| 63-225858 | | 9/1988 | (JP) . |
| 3-161861 | | 7/1991 | (JP) . |
| 04033162 | * | 2/1992 | (JP) . |

* cited by examiner

Primary Examiner—John S. Hilten
Assistant Examiner—Charles H. Nolan, Jr.
(74) Attorney, Agent, or Firm—Hogan & Hartson, LLP

(57) ABSTRACT

An image-forming method and device and an electronic apparatus incorporating the device are provided. At least one line of a character string is input by using letter/symbol characters respectively representative of characters including letters symbols and a space, and a ruled line character which designates, by its position in the character string, a position where a ruled line should be drawn in a manner connectable to other ruled lines. An image is formed which includes images of the characters represented respectively by the letter/symbol characters, and an image of the ruled line drawn at the position.

39 Claims, 30 Drawing Sheets

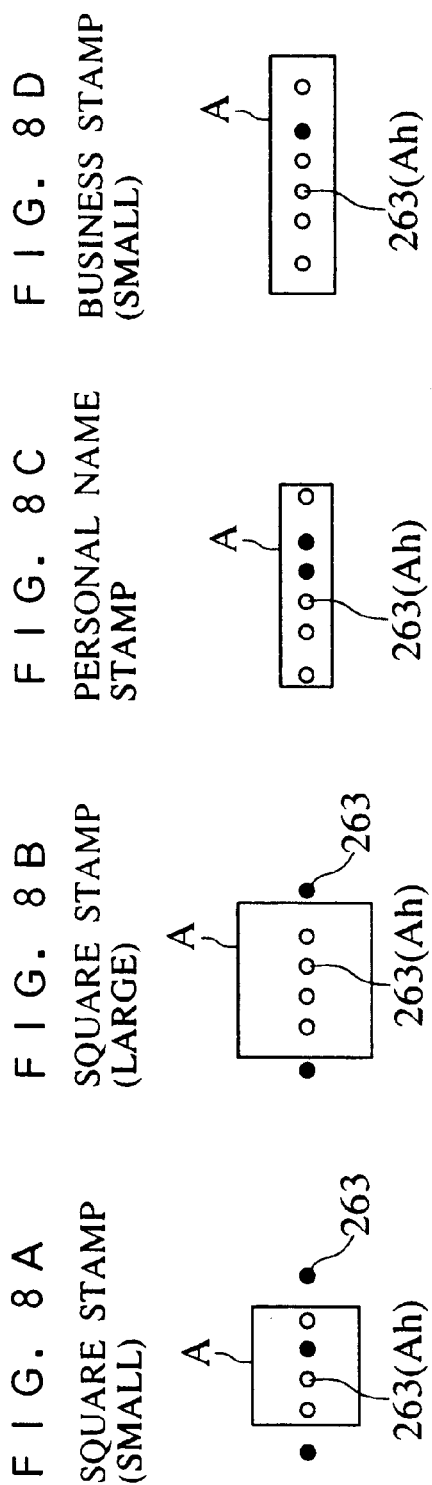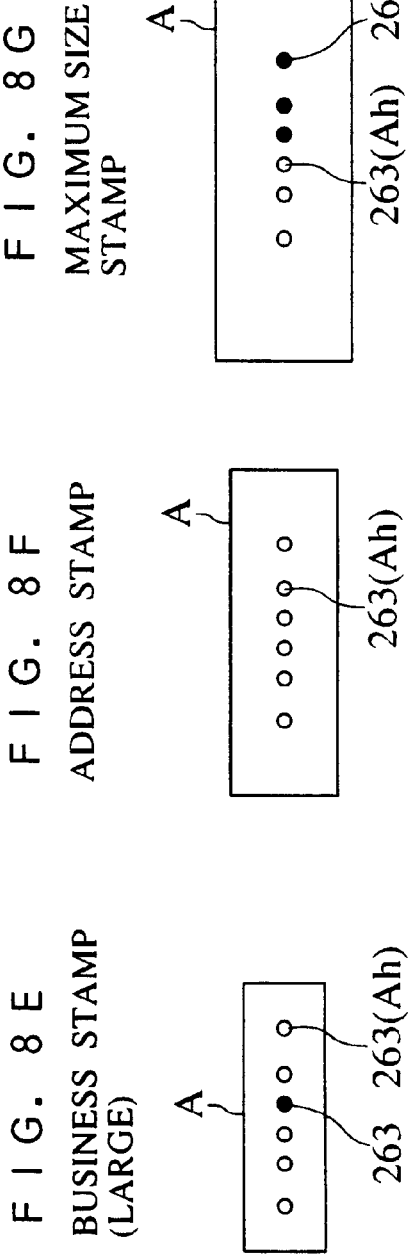

FIG. 32B

| ITEM | INSTRUCTION |
|---|---|
| S41 | DIVIDE EACH LINE INTO " AREA A " AND " AREA B " |
| S42 | SELECT A COMBINATION HAVING MAXIMUM VALUE OF " LAi + LBj " |
| S43 | DETERMINE CHARACTER SIZE |
| S44 | CALCULATE CHARACTER LENGTH OF STAMP CHARACTER IMAGES IN EACH OF ALL AREAS A AND AREAS B |
| S45 | SELECT A COMBINATION GIVING MAXIMUM VALUE OF " LAi + LBj " OR A COMBINATION GIVING MINIMUM VALUE OF DETERMINATION PARAMETER |
| S46 | ASSUME LAYOUT REFERENCE LINE |
| S47 | LAYOUT EACH STAMP CHARACTER IMAGE ON LAYOUT REFERENCE LINE |
| S48 | CALCULATE AREA LENGTHS WA , WB OF AREA A AND AREA B TO DETERMINE DIVISION POSITION |
| S49 | LAY OUT RESPECTIVE STAMP CHARACTER IMAGES IN AREA A AND AREA B ON EACH LINE , AND ALIGN ALIGNMENT CHARACTER IMAGES AT DIVISION POSITION |

FIG. 35A
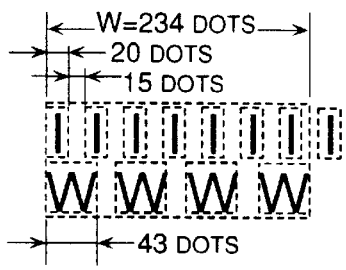
FIG. 35B
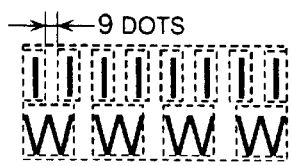
FIG. 36
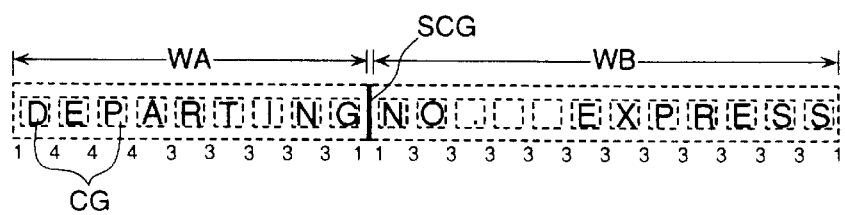
FIG. 37A
| T | I | C | K | E | T |
|---|---|---|---|---|---|
15  32  31  31  31  31  15
T R A I N N O   E X P R E S S
12 26 25 25 25 12 3 3 3 3 3 3 3 3
D E P A R T I N G         ( M / D )
4 4 4 3 3 3 3 3 14 9 9 9 8 8 8 M 7 8 4
FIG. 37B
| T | I | C | K | E | T |
|---|---|---|---|---|---|
| TRAIN | | | NO   EXPRESS | | |
| DEPARTING | | |      ( M / D ) | | |

FIG. 38A
PRIOR ART

| G | H | I | L | M | N |

FIG. 38B
PRIOR ART

| G | H | I | J | L | M | N |

FIG. 39A
PRIOR ART

| G | H | L | M | N |
| Q | R | U | V | W |
| A | B | C | D | E |

FIG. 39B
PRIOR ART

| G | H | I | L | M | N |
| Q | R | I | U | V | W |
| A | B | W | C | D | E |

FIG. 39C
PRIOR ART

| G | H | I | L | M | N |
|   | Q |   | U | V | W |
| A |   | B |   | C |   |

IMAGE-FORMING METHOD AND DEVICE AND ELECTRONIC APPARATUS INCORPORATING THE DEVICE

BACKGROUND OF THE INVENTION

1. Field of the Invention

This invention relates to an image-forming method and device for inputting characters, such as letters and symbols, and ruled lines to form an image, for use in electronic apparatuses, such as a stamp making apparatus, a tape printing apparatus or a word processor, and an electronic apparatus incorporating the device.

2. Prior Art

In a conventional word processor, when vertical ruled lines and horizontal ruled line are combined with each other to form a table or a frame (hereinafter referred to as "the ruled line frame") and characters are entered into the ruled line frame (from a left side toward a right side), if the number of input characters reaches the maximum number of characters which can be entered into the ruled line frame (hereinafter the maximum number of characters which can be entered in the ruled line frame is referred to as "maximum enterable character number"), further entry of characters is inhibited or automatic line feed is carried out to automatically expand the ruled line frame to a lower line. This is because the horizontal width of a printing paper is limited in a word processor or the like and hence if a ruled line frame is expanded easily or carelessly in a lateral (horizontal) direction, the ruled line frame can become wider than the printing paper.

Therefore, when characters are entered into a ruled line frame already formed and the entry is continued even after the number of input characters exceeds the maximum enterable character number, a function of "column insertion" is used to expand the ruled line frame in a horizontal direction and thereafter the entry is resumed. Inversely, if part of characters already entered into a ruled line frame are deleted therefrom, extra blank space can be generated, so that to delete the blank space, a function of "column deletion" is used to reduce the ruled line frame in a horizontal direction.

Further, in conventional electronic apparatuses, such as a stamp making apparatus and a tape printing apparatus, since the whole apparatus is required to be designed compact in size, a very small screen is employed as a display screen thereof. Accordingly, when the operator desires to create a table or a frame while viewing the small display screen, although the creation itself is possible, the whole table or frame can not be viewed within the screen and he (she) has difficulty in recognizing the same in its entirety, which makes the operation extremely troublesome. To eliminate this inconvenience, outer frames having various outer shapes for surrounding all the characters entered (see FIGS. 15A to 15C) or outer frames each having an inside thereof divided into a plurality of horizontal sections by horizontal division ruled lines (see FIGS. 16A to 16C) are provided in advance for electronic apparatuses of the above-mentioned kind.

As described above, in the conventional word processor or the like, when characters exceeding in number the maximum enterable character number are to be entered in a ruled Line frame, it is required to expect the number of excess characters and expand a ruled line frame by using the function of "column insertion", while when characters already entered in a ruled line frame are deleted, the function of "column deletion" has to be employed to reduce the ruled line frame, which makes a character entry operation and a ruled line-forming operation complicated, resulting in degraded operating efficiency. The same inconvenience occurs when a ruled line (hereinafter referred to as "the division ruled line") for dividing a row characters at a position in the direction along the row arranged within a ruled line frame, and characters are additionally entered in areas on either or both side(s) of the division ruled line, or alternatively existing characters are deleted from the same.

It is contemplated that the inconvenience concerning a division ruled line arranged in a ruled line frame can be eliminated by allowing the division ruled line to automatically move in the direction of a row of characters in accordance with the entry (addition) or deletion of the characters (see FIGS. 38A, 38B). In this case, however, if the ruled line frame contains a plurality of lines and at the same time the division ruled lines divide or extend across at least two of them, it is difficult to arrange the division ruled lines in an aligned manner. More specifically, when alphanumeric characters different in width from each other (for instance, "I" and "W") are entered in a ruled line frame including movable division ruled lines for proportional printing, the division ruled lines are displaced from each other, which results in degraded appearance of a produced image (print image) (see FIGS. 39A, 39B).

Further, even if all the alphanumeric characters entered are identical in width, when the number of characters entered on either side of a division ruled line is different between lines, it can be required to insert space on the same side of the division ruled line to align the division ruled lines, which makes the character entry operation troublesome (see FIG. 39C).

Further, when a ruled line frame is a fixed-size type which can not be expanded in any of upward, downward, leftward and rightward directions under a restriction imposed by a printing object, such as a label, and at the same time has an inside thereof divided beforehand into a plurality of areas by vertical or horizontal ruled lines (hereinafter such vertical and horizontal ruled lines within a ruled line frame are referred to as "in-frame ruled lines"), assuming, for instance, that characters exceeding in number the maximum enterable character number are desired to be entered in the divisional areas, or that characters already entered therein are desired to be deleted therefrom, the conventional word processor requires the operator to once delete the in-frame ruled lines and then draw the same again after entry of the characters. Further, if characters within a ruled line frame are uniformly laid out, once the above entry or deletion of characters is effected, the uniform layout of the characters within the ruled line frame is required to be set again.

The conventional electronic apparatus having a very small display screen is capable of forming a table or a frame with ease. However, the operator finds it difficult to grasp the number of characters which can be entered in each area in the table or the frame, or a suitable proportion in size between areas. Further, the freedom of creating a table or a frame is limited. On the other hand, if it is possible to make use of an underlining function of drawing a ruled line (underline) in response to character entry, as is already realized by word processors, a frame or the like can be created with ease and efficiency, in a manner free from i.e. without using an outer frame provided in advance. In this case, however, even if an underlines is added to form a continuous line, a gap is produced between the underline and a ruled line (vertical ruled line) that should cross the underline at right angles, which makes the appearance of a table or a frame extremely unattractive. For instance, images shown in FIGS. 41A and 41B are formed when images shown in FIGS. 40A and 40B are desired to be formed.

SUMMARY OF THE INVENTION

It is a first object of the invention to provide an image-forming method and device and an electronic apparatus incorporating the device which are capable of carrying out a character entry operation and a ruled line-forming operation with ease and efficiency, and are capable of creating an image having desired ruled lines, according to the entered characters.

It is a second object of the invention to provide an image-forming method and device and an electronic apparatus incorporating the device which are capable of aligning division ruled lines movable in response to the entry or deletion of characters and arranged on a plurality of lines at an identical position in the direction along the lines such that they form a straight line, regardless of the entry or deletion of characters, thereby enabling an attractive image to be easily formed without spoiling excellent appearance thereof.

It is a third object of the invention to provide an image-forming method and device and an electronic apparatus incorporating the device which are capable of easily forming a generally well-balanced image including ruled lines, without carrying out special operations, even when an area having a fixed length is divided into a plurality of areas by at least one ruled line and at least one character is newly added to or deleted from characters uniformly laid out in the fixed length area.

It is a fourth object of the invention to provide an image-forming method and device and an electronic apparatus incorporating the device which are capable carrying out a character entry operation and a ruled line-forming operation with ease and efficiency, even when characters exceeding in number the maximum enterable number of character numbers are entered between ruled lines, or when characters already entered are deleted from therebetween.

To attain the above objects, according to a first aspect of the invention, there is provided a method of forming an image, comprising the steps of:

inputting at least one line of a character string by using letter/symbol characters respectively representative of characters including letters, symbols and a space, and a ruled line character which designates, by its position in the character string, a position where a ruled line should be drawn in a manner connectable to other ruled lines; and forming an image including images of the characters represented respectively by the letter/symbol characters, and an image of the ruled line drawn at the position.

To attain the above objects, according to a second aspect of the invention, there is provided an image-forming device comprising:

input means for inputting at least one line of a character string by using letter/symbol characters respectively representative of characters including letters, symbols and a space, and a ruled line character which designates, by its position in the character string, a position where a ruled line should be drawn in a manner connectable to other ruled lines; and image-forming means for forming an image including images of the characters represented respectively by the letter/symbol characters, and an image of the ruled line drawn at the position.

According to this image-forming method and device, a ruled line character designates, by its position in the character string, a position where a ruled line should be drawn in a manner connectable to other ruled lines, and in an image formed, the ruled line is drawn at the position. Therefore, it is possible to carry out a character entry operation and a ruled line-forming operation with ease and efficiency, and create an image having desired ruled lines, in dependence on input characters. It should be noted that the "ruled line character" designates a position of a ruled line in a document created by an electronic device, while the "letter/symbol characters" are entered into the document similarly as entities which represent characters including space, and handled therein, and are distinguished in this respect from so-called characters. Characters may be entered by using the letter/symbol characters for vertical writing or horizontal writing.

Preferably, the step of forming the image includes drawing the ruled line in a manner such that the ruled line reaches an adjacent one of the other ruled lines.

Preferably, the image-forming means draws the ruled line in a manner such that the ruled line reaches an adjacent one of the other ruled lines.

According to these preferred embodiment, it is possible to draw a ruled line having an excellent appearance at a desired location with ease.

More specifically, the method includes the step of displaying the ruled line character on a display screen in a manner such that the ruled line character has the same width as each of the letter/symbol characters and that the ruled line character can be handled similarly to the each of the letter/symbol characters, and the step of forming the image includes drawing the ruled line in a manner such that a segment of the ruled line corresponds to the ruled line character.

More specifically, the image-forming device includes display means for displaying the ruled line character on a display screen in a manner such that the ruled line character has the same width as each of the letter/symbol characters and that the ruled line character can be handled similarly to the each of the letter/symbol characters, and the image-forming means draws the ruled line in a manner such that a segment of the ruled line corresponds to the ruled line character.

According to these preferred embodiment, the ruled line character can be handled similarly to the letter/symbol characters which represent characters and are usually employed in inputting the characters. Therefore, it is possible to create and change the ruled line with ease.

For instance, the image including the images of the characters and the image of the ruled line is a print image that can be displayed on a display screen and be used for printing.

Particularly to attain the second object, in a method according to a preferred embodiment the invention, the ruled line character is an aligned ruled line character which designates the position of the ruled line in a manner such that segments of the ruled line on different lines are aligned in a line, the step of inputting the at least one line of the character string including inputting each of a plurality of lines of the letter/symbol characters for a character image area having a fixed length, and the aligned ruled line character to at least two different lines of the plurality of lines, the step of forming the image including drawing the segments of the ruled line at the at least two different lines, in a manner such that the segments of the ruled line are aligned to form a straight line.

Similarly, in an image-forming device according to a preferred embodiment of the invention, the ruled line character is an aligned ruled line character which designates the position of the ruled line in a manner such that segments of the ruled line on different lines are aligned in a line, the input means inputting each of a plurality of lines of the letter/symbol characters for a character image area having a fixed length, and the aligned ruled line character to at least two different lines of the plurality of lines, the image-forming means drawing the segments of the ruled line at the at least two different lines, in a manner such that the segments of the ruled line are aligned to form a straight line.

According to these preferred embodiments, as the ruled line character, there is employed the aligned ruled line character which designates the position of the ruled line in a manner such that segments of the ruled line on different lines are aligned in a line. Therefore, an image is formed such that ruled lines drawn respectively in at least two different lines of a plurality of lines of characters which are entered in a character image area having a fixed length by using the letter/symbol characters are aligned to form a straight line.

More preferably, the step of forming the image includes the; steps of selecting from all possible combinations of a string of all letter/symbol characters on a string head side of the aligned ruled line character on each of the at least two different lines and a string of all letter/symbol characters on a string tail side of the aligned ruled line character on each of the at least two different lines, a combination which gives a minimum spacing between each pair of adjacent characters assuming that all characters represented by the selected combination are uniformly laid out in the character image area, carrying out imaginary uniform layout of the all characters represented by the selected combination and the ruled line in the character image area, and drawing segments of the ruled line each corresponding to the aligned ruled line character input in the each of the at least two different lines, at the position of the ruled line determined by a result of the imaginary uniform layout, in an aligned manner to form a straight line.

More preferably, the image-forming means includes combination-selecting means for selecting from all possible combinations of a string of all letter/symbol characters on a string head side of the aligned ruled line character on each of the at least two different lines and a string of all letter/symbol characters on a string tail side of the aligned ruled line character on each of the at least two different lines, a combination which gives a minimum spacing between each pair of adjacent characters assuming that all characters represented by the selected combination are uniformly laid out in the character image area, imaginary layout means for carrying out imaginary uniform layout of the all characters represented by the selected combination and the ruled line in the character image area,, and aligned ruled line-drawing means for drawing segments of the ruled line each corresponding to the aligned ruled line character input in the each of the at least two different lines, at the position of the ruled line determined by a result of the imaginary uniform layout, in an aligned manner to form a straight line.

According to these preferred embodiments, from all possible combinations of a string of all letter/symbol characters on a string head side of the ruled line character on each of the at least two different lines and a string of all letter/symbol characters on a string tail side of the each ruled line character on each of the at least two different lines, a combination is selected which gives a minimum spacing between each pair of characters assuming that the characters represented by the combination of the strings of the all letter/symbol characters are uniformly laid out. Then, all the letter/symbol characters of the selected combination of strings are imaginarily uniformly laid out. Segments of the ruled line each corresponding to the ruled line character input in each of the at least two different lines are drawn at the position of the ruled line determined by the result of the imaginary layout of the characters, in an aligned manner to form a straight line. This makes it possible to always align ruled line segments on respective different lines and further lay out characters in a well-balanced manner, when a ruled line extending through a plurality of lines is required to be drawn. Further, since the above combination is selected with reference to spacing between each pair of characters (inter-character distance) to determine a position where the ruled Line should be drawn, and hence even when characters having different widths are to be arranged in a mixed manner, it is possible to lay out the characters in a suitable and attractive manner.

Alternatively, the step of forming the image includes the steps of selecting from all possible combinations of a string of all letter/symbol characters on a string head side of the aligned ruled line character on each of the at least two different lines and a string of all letter/symbol characters on a string tail side of the aligned ruled line character on each of the at least two different lines, a combination which gives a largest sum total of character lengths, carrying out imaginary uniform layout of all characters represented by the selected combination and the ruled line in the character image area, and drawing segments of the ruled line each corresponding to the aligned ruled line character input in the each of the at least two different lines, at the position of the ruled line determined by a result of the imaginary uniform layout, in an aligned manner to form a straight line.

Similarly, the image-forming means includes combination-selecting means for selecting from all possible combinations of a string of all letter/symbol characters on a string head side of the aligned ruled line character on each of the at least two different lines and a string of all letter/symbol characters on a string tail side of the aligned ruled line character on each of the at least two different lines, a combination which gives a largest sum total of character lengths, imaginary layout means for carrying out imaginary uniform layout of all characters represented by the selected combination and the ruled line in the character image area, and aligned ruled line-drawing means for drawing segments of the ruled line each corresponding to the aligned ruled line character input in the each of the at least two different lines, at the position of the ruled line determined by a result of the imaginary uniform layout, in an aligned manner to form a straight line.

According to these preferred embodiments, from all possible combinations of a string of all letter/symbol characters on a string head side of the ruled line character on each of the at least two different lines and a string of all letter/symbol characters on a string tail side of the each ruled line character on each of the at least two different lines, a combination is selected which has a largest sum total of character lengths. Then, all the letter/symbol characters of the selected combination of strings are imaginarily uniformly laid out. Segments of the ruled line each corresponding to the ruled line character input in each of the at least two different lines are drawn at the position of the ruled line determined by the result of the imaginary layout of the characters, in an aligned manner to form a straight line. Therefore, the same advantageous effects as described above can be obtained.

Further preferably, the step of forming the image includes providing spacing between the ruled line and a character adjacent thereto in a manner such that the spacing is smaller than spacing between each pair of adjacent characters.

Further preferably, the image-forming means provides spacing between the ruled line and a character adjacent thereto in a manner such that the spacing is smaller than spacing between each pair of adjacent characters.

According to these preferred embodiments, it is possible to layout characters together with ruled lines such that they have excellent appearance.

Further preferably, the step of forming the image further includes uniformly laying out images of characters represented by the string of the all letter/symbol characters on the string head side in a string head-side portion of the character image area and images of characters represented by the string of the all letter/symbol characters on the string tail side in a string tail-side portion of the character image area, the ruled line dividing the character image area into the string head-side portion and the string tail-side portion.

Further preferably, the image-forming means includes uniform layout means for uniformly laying out images of characters represented by the string of the all letter/symbol characters on the string head side in a string head-side portion of the character image area and images of characters represented by the string of the all letter/symbol characters on the string tail side in a string tail-side portion of the character image area, the ruled line dividing the character image area into the string head-side portion and the string tail-side portion.

According to these preferred embodiments, it is possible to layout characters on both sides of the ruled line such that they have excellent appearance.

In a method according to a preferred embodiment of the invention, the step of inputting the at least one line of the character string includes inputting the letter/symbol characters, and a pair of ruled line characters on an identical line, for designating positions where respective ruled lines should be drawn in relation to each other in a manner defining therebetween a range of at least one of the letter/symbol characters input.

In an image-forming device according to a preferred embodiment of the invention, the input means inputs the letter/symbol characters, and a pair of ruled line characters on an identical line, for designating positions where respective ruled lines should be drawn in relation to each other in a manner defining therebetween a range of at least one of the letter/symbol characters input.

According to these preferred embodiments, a pair of ruled line characters on an identical line designate positions where respective ruled lines should be drawn in relation to each other to define or enclose a range of at least one of the letter/symbol characters input. Therefore, a desired portion of a character string can be easily enclosed by rules lines.

More preferably, the step of inputting the at least one line of the character string includes shifting a string tail-side one of the pair of ruled line characters toward a string tail by a distance corresponding to at least one letter/symbol character added between the pair of ruled line characters, or shifting the string tail-side one of the pair of ruled line characters toward a string head by a distance corresponding to at least one letter/symbol character deleted from between the pair of ruled line characters, and the step of forming the image includes drawing one of the ruled lines at a position shifted according to the shift in position of the string tail-side one of the pair of ruled line characters.

More preferably, the input means includes shifting means for shifting a string tail-side one of the pair of ruled line characters toward a string tail by a distance corresponding to at least one letter/symbol character added between the pair of ruled line characters, or shifting the string tail-side one of the pair of ruled line characters toward a string head by a distance corresponding to at least one letter/symbol character deleted from between the pair of ruled line characters, and the image-forming means draws one of the ruled lines at a position shifted according to the shift in position of the string tail-side one of the pair of ruled line characters.

According to these preferred embodiments, ruled characters are handled similarly to letter/symbol characters and hence even after a pair of ruled line characters are entered, new letter/symbol characters can be input between the pair of ruled line characters or letter/symbol characters therebetween can be deleted. In other words, a string tail-side ruled line character is moved toward a string tail or a string head in a manner interlocked with the entry or deletion of letter/symbol characters between or from between a pair of ruled line characters, whereby the operator can easily form an image having desired ruled lines, i.e. an image having ruled lines defining letter/symbol characters, without being required to be conscious of the maximum enterable character number and a blank generated when a letter/symbol character is deleted.

Further preferably, the step of forming the image includes the step of connecting between upper ends of segments of a pair of the ruled lines designated respectively by the ruled line characters and between lower ends of the segments, by a pair of connection ruled lines.

Further preferably, the image-forming means includes connecting means for connecting between upper ends of segments of a pair of the ruled lines designated respectively by the ruled line characters and between lower ends of the segments, by a pair of connection ruled lines.

According to these preferred embodiment, a surrounding frame surrounding letter/symbol characters is formed by a pair of ruled line characters and a pair of connection ruled lines. Therefore, it is possible to enclose a desired portion of the character string by the ruled lines with ease.

Still more preferably, the step of forming the image includes extending each of the pair of connection ruled lines toward a string tail by a distance corresponding to at least one letter/symbol character added, to thereby connect the pair of connection ruled lines to the pair of ruled lines, when the at least one letter/symbol character is added between the pair of ruled line characters, and contracting the each of the pair of connection ruled lines toward a string head by a distance corresponding to at least one letter/symbol character deleted, to thereby connect the pair of connection ruled lines to the pair of ruled lines, when the at least one letter/symbol character is deleted from between the pair of ruled line characters.

Still more preferably, the image-forming means causes the connecting means to extend each of the pair of connection ruled lines toward a string tail by a distance corresponding to at least one letter/symbol character added, to thereby connect the pair of connection ruled lines to the pair of ruled lines, when the at least one letter/symbol character is added between the pair of ruled line characters, and contract the each of the pair of connection ruled lines toward a string head by a distance corresponding to at least one letter/symbol character deleted, to thereby connect the pair of connection ruled lines to the pair of ruled lines, when the at least one letter/symbol character is deleted from between the pair of ruled line characters.

According to these preferred embodiments, in accordance with the entry or deletion of letter/symbol characters between or from between the ruled line characters, the connection ruled lines are extended toward a string tail or contracted toward a string head to thereby connect the pair of connection ruled lines to the pair of ruled line characters. Therefore, it is possible to automatically expand or contract the surrounding frame in a manner interlocked with the entry or deletion of letter/symbol characters.

Particularly to attain the third object, in a method according to a preferred embodiment of the invention, the step of inputting the at least one line of the character string includes inputting a plurality of letter/symbol characters and the ruled line character in a manner such that the ruled line character divides the plurality of letter/symbol characters at a desired position, for an character image area having a fixed length, and the step of forming the image includes uniformly laying out images of the characters in the character image area, and drawing the ruled line at the position designated by the ruled line character according to the result of the layout of the characters.

Similarly, in an image-forming device according to a preferred embodiment of the invention, the input means inputs a plurality of letter/symbol characters and the ruled line character in a manner such that the ruled line character divides the plurality of letter/symbol characters at a desired position, for an character image area having a fixed length, and the image-forming means includes uniform layout means for uniformly laying out images of the characters in the character image area, and ruled line character-drawing means for drawing the ruled line at the position designated by the ruled line character according to the result of the layout of the characters.

According to these preferred embodiments, images of characters are uniformly laid out in a character image area having a fixed length by using the letter/symbol characters, and the ruled line is drawn at the position designated by the ruled line character according to the result of the layout of the characters. Therefore, it is possible to easily form an image having images of the letter/symbol characters arranged in the character image area in a well-balanced manner, without carrying out special operations.

More preferably, the step of inputting the at least one line of the character string includes adding at least one letter/symbol character to the plurality of letter/symbol characters input or deleting at least one letter/symbol character from the plurality of letter/symbol characters input, and the step of forming the image includes uniformly laying out all of images of characters represented by the resulting letter/symbol characters in the character image area, and drawing the ruled line at the position designated by the ruled line character according to the result of the layout of the characters.

More preferably, the input means includes adding means for adding at least one letter/symbol character to the plurality of letter/symbol characters input and deleting means for deleting at least one letter/symbol character from the plurality of letter/symbol characters input, and the image-forming means includes uniform layout means for uniformly laying out all of images of characters represented by the resulting letter/symbol characters in the character image area, and ruled line-drawing means for drawing the ruled line at the position designated by the ruled line character according to the result of the layout of the characters.

According to these preferred embodiments, when letter/symbol characters are added or deleted for entry or deletion of images thereof in a character image area, images of all the resulting letter/symbol characters are uniformly laid out after the entry or deletion, so that it is possible to easily form an image having images of the letter/symbol characters arranged in the character image area in a well-balanced manner, without carrying out special operations. Further, the ruled line is moved according to the result of the uniform layout operation, and hence it is possible to lay out letter/symbol characters by exploiting the advantage of the ruled line character to form an image of the character string which gives little sense of disorder or incongruity.

Particularly to attain the fourth object, in a method according to a preferred embodiment of the invention, the step of inputting the at least one line of the character string includes inputting a plurality of letter/symbol characters, and the ruled line character, in a manner such that the ruled line character divides the plurality of letter/symbol characters at a desired position, for an character image area having a fixed length, and the step of forming the image includes changing a size of each of images of the characters represented by the plurality of letter/symbol characters in a manner such that all of the images of the characters are fitted within the character image area, and drawing the ruled line within the character image area at the position designated by the ruled line character in a manner dependent on the result of the change of the size of the each of the images of the characters.

Similarly, in an image-forming device according to a preferred embodiment of the invention, the input means inputs a plurality of letter/symbol characters and the ruled line character in a manner such that the ruled line character divides the plurality of letter/symbol characters at a desired position, for an character image area having a fixed length, and the image-forming means includes character size-changing means for changing a size of each of images of the characters represented by the plurality of letter/symbol characters in a manner such that all of the images of the characters are fitted within the character image area, and ruled line-drawing means for drawing the ruled line within the character image area at the position designated by the ruled line character in a manner dependent on the result of the change of the size of the each of the images of the characters.

According to these preferred embodiments, when letter/symbol characters are added for a character image area, images of all letter/symbol characters including the added ones are reduced in size such that they can be fitted within the character image area, or when letter/symbol characters are deleted, images of all the remaining letter/symbol characters are increased in size such that full space of the character image area can be used in a well-balanced manner, and hence it is possible to easily create an image having letter/symbol characters having a proportional size to the character image area without carrying out special operations. Further, since letter/symbol characters can be moved in accordance with the above reduction or expansion, the operator can lay out letter/symbol characters by using ruled line characters to form an image which gives little sense of incongruity.

In a method according to a preferred embodiment of the invention, the step of inputting the at least one line of the character string includes designating provision of an underline for at least one letter/symbol character adjacent to the ruled line character, and the step of forming the image includes extending a ruled line-side end of the underline to thereby connect the underline with the ruled line.

In an image-forming device according to a preferred embodiment of the invention, the input means includes underline-designating means for designating provision of an underline for at least one letter/symbol character adjacent to the ruled line character, and the image-forming means includes underline-drawing means for drawing the underline for an image of each of at least one character represented by the at least one letter/symbol character, and underline-extending means for extending a ruled line-side end of the underline to thereby connect the underline with the ruled line.

According to these preferred embodiments, when an underline is provided in an area of a letter/symbol character adjacent to a ruled line character, an end of the underline on a ruled line side is extended to thereby connect the underline to the adjacent ruled line, so that a function of forming underlines can be exploited similarly to a function of forming ruled lines (horizontal ruled lines) and hence a table or a frame favorably comparable with ones formed by the conventional method can be easily produced with a high degree of freedom.

Now, the term "underline" represents a line parallel to a direction along a character string and drawn for each of images of letter/symbol characters. This also applies to the case of vertical writing.

More preferably, the step of inputting the at least one line of the character string includes adding at least one letter symbol/character to the at least one letter/symbol character for which the provision of the underline is designated, and the step of forming the image including drawing the underline for an image of each of the at least one letter/symbol character added.

More preferably, the input means includes adding means for adding at least one letter symbol/character to the at least one letter/symbol character for which the provision of the underline is designated, and the image-forming means causes the underline-drawing means to draw the underline for an image of each of the at least one letter/symbol character added.

According to these preferred embodiments, a required underline can be automatically formed simply by adding new letter/symbol characters to letter/symbol characters already underlined.

More preferably, a segment of the ruled line corresponding to the ruled line character forms part of a frame enclosing the letter/symbol characters.

According to this preferred embodiment, a surrounding frame surrounding letter/symbol characters can be easily created with a high degree of freedom, by using ruled line characters and underlines.

To attain the above objects, according to a third aspect of the invention, there is provided an electronic apparatus comprising:

an image-forming device, the image-forming device comprising input means for inputting at least one line of a character string by using letter/symbol characters respectively representative of characters including letters, symbols and a space, and a ruled line character which designates, by its position in the character string, a position where a ruled line should be drawn in a manner connectable to other ruled lines; and image-forming means for forming an image including images of the characters represented respectively by the letter/symbol characters, and an image of the ruled line drawn at the position; and a printing device which is capable of printing the image formed by the image-forming device.

According to this electronic apparatus, it is possible to carry out a sequence of operations, such as a character entry, forming of ruled lines, printing and so forth, in a quick, simplified manner.

The above and other objects, features, and advantages of the invention will become more apparent from the following detailed description taken in conjunction with the accompanying drawings.

BRIEF DESCRIPTION OF THE DRAWINGS

FIGS. 8A to 8G are diagrams showing patterns for discriminating stamp bodies of various stamps;

FIGS. 32A and 32B form a flowchart showing a procedure for laying out stamp character images and aligned ruled line character images on a plurality of lines;

FIGS. 35A and 35B are diagram which are useful in explaining inconveniences which can result from selection of a combination of stamp character images only based on a character length;

FIG. 36 is a diagram showing an image of a layout reference line;

FIGS. 37A and 37B are diagrams each schematically showing a plate-making image created by the fourth example;

FIGS. 38A and 38B are diagrams, which are useful in explaining a case where a division ruled line is moved;

FIGS. 39A to 39C are diagrams, which are useful in explaining a case where division ruled lines on a plurality of lines are not aligned with each other;

DETAILED DESCRIPTION

Figure 1A:
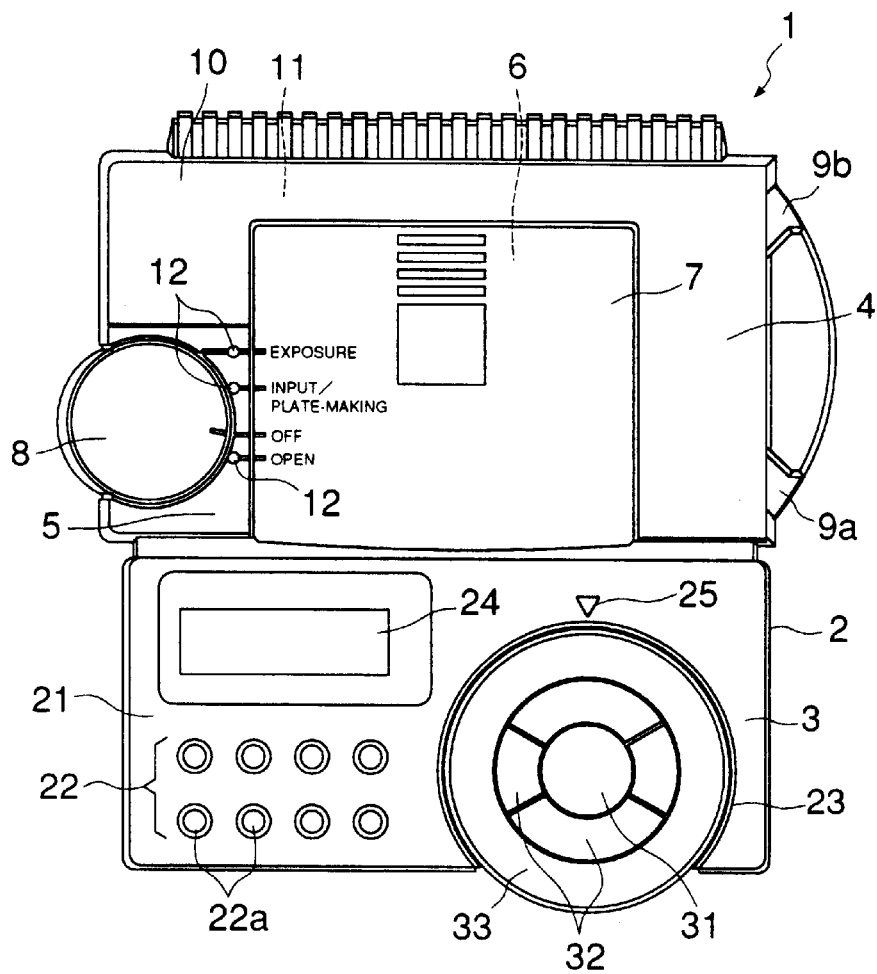
FIG. 1A is a plan view of an appearance of a stamp making apparatus to which is applied an embodiment of the invention.
Figure 1B:
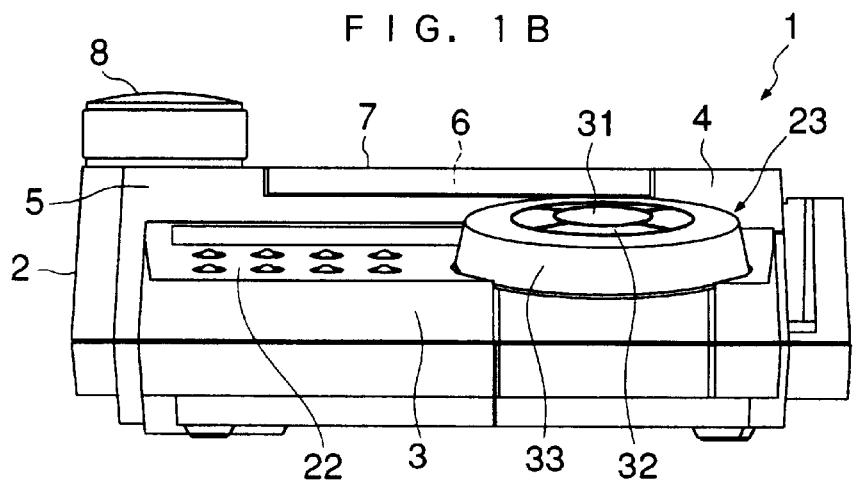
FIG. 1B is a front view of an appearance of the stamp making apparatus.
Figure 11:
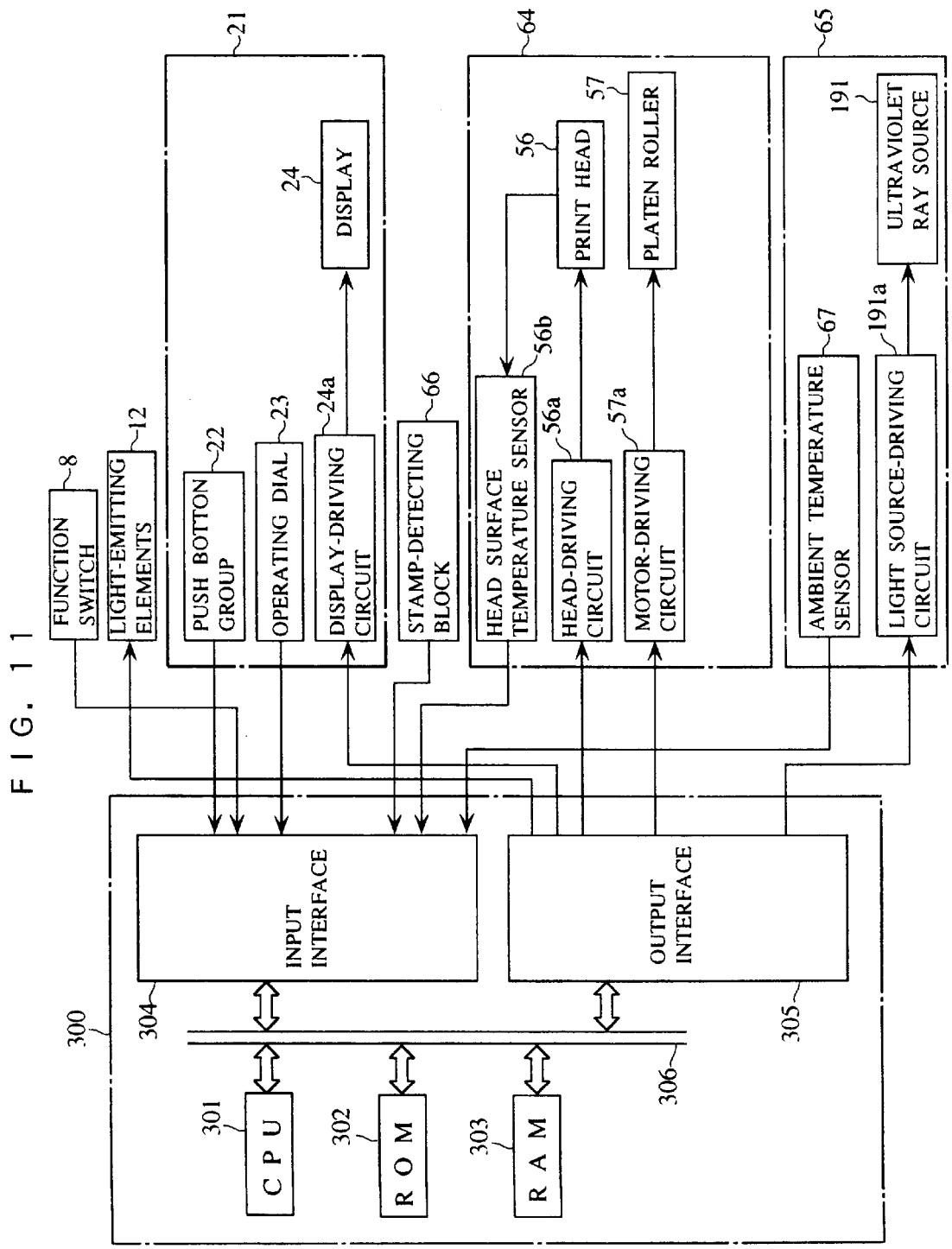
FIG. 11 is a block diagram of a control block and devices connected thereto of the stamp making apparatus.

The invention will now be described in detail with reference to drawings showing an embodiment thereof. In this embodiment, an image-forming method and device and an electronic apparatus incorporating the device, according to the invention, are applied to a stamp making apparatus for making stamps. The stamp making apparatus makes a desired stamp by exposing a stamp body having a stamping face made of ultraviolet-curing resin to ultraviolet rays via a mask of an ink ribbon printed with a stamp image of characters (letters, symbols, figures or the like). The image-forming method and device and the electronic apparatus incorporating the device, according to the embodiment of the invention, are mainly used for producing stamp image data for generating a mask on the ink ribbon. FIG. 1A is a plan view of the stamp making apparatus, while FIG. 1B is a front view of the same. FIG. 11 is a block diagram of a control block and devices connected thereto of the stamp making apparatus.

As shown in FIGS. 1A and 1B, the stamp making apparatus 1 includes a casing 2 having upper and lower divisional portions, an electronic block 3 arranged in a front part of the casing 2, and a mechanical block 4 arranged in a rear part of the same. The mechanical block 4 is comprised of a mechanical block body 5, a compartment 6 formed in a central area of the mechanical block 4, for receiving therein a stamp body A (see FIG. 3) as a stamp-making object material to mount the stamp body A in the mechanical block body 5, and a lid 7 for opening and closing the compartment 6, which is formed with a window. In a left-side portion of the mechanical block 4 as viewed in the figures, a function switch 8 is provided for switching the operation of the stamp making apparatus 1 e.g. to plate-making (printing) or exposure, as well as for permitting the lid 7 to be opened. Information of each switching operation of the function switch 8 is sent to an input interface 304 of a control block 300, described hereinafter, while indications of "EXPOSURE", "INPUT/PLATE-MAKING", "OFF" and "OPEN" are provided at respective operating positions. At the operating positions of "EXPOSURE", "INPUT/PLATE-MAKING", and "OPEN", there are provided respective light-emitting elements 12 connected to an output interface 305 of the control block 300. Further, in a right-side portion of the mechanical block 4, there are formed an inserting slot 9a for feeding a plate-making sheet B (see FIG. 4) from which is made a stamp character label, referred to hereinafter, and a take-out slot 9b for delivering the plate-making sheet B therefrom. Further, the mechanical block 4 has a maintenance cover 10 removably mounted a portion thereof outside the compartment 6, and an ink ribbon cartridge 11 holding an ink ribbon C is mounted under the maintenance cover 10 (see FIG. 2).

The electronic block 3 has an operating block 21 arranged in a top thereof and contains the control block 300 therein. The operating block 21 includes a push button group 22 and an operating dial 23 both connected to the input interface 304 of the control block 300, and a display-driving circuit 24a connected to the output interface 305 of the control block 300 and an display 24 driven by the display-driving circuit 24a. The operating dial 23 has a trial structure of an execution key 31 having a circular shape and arranged in the center, a cursor/conversion key 32 having four divisional blocks arranged along the outer periphery of the execution key 31 to form an annular shape, and a character entry key 33 having an annular shape and arranged along the outer periphery of the cursor/conversion key 32. On the surface of the character entry key 33, alphabetical letters, numerals, symbols, etc., not shown, are printed. The inputting of stamp characters (letter/symbol characters) is carried out by turning the character entry key 33 to set each of desired alphabetic letters to a triangle mark 25, and pushing the execution key 31 whenever each of the desired alphabetic letters is set to the triangle mark 25. For a Japanese-language type of the stop making apparatus which is capable of inputting Japanese characters, hirakana characters representative of the Japanese syllabary, are also printed on the surface of the character entry key, and can be entered similarly. When kanji letters are to be entered, desired ones of the input hirakana letters are converted to kanji letters as required by operating the cursor/conversion key 32. And, when desired kanji letters are displayed on the display 24, the character entry is finally determined.

Further, when the size or typeface of the stamp character is to be changed or an outer frame surrounding the periphery of the whole stamp character is to be designated,, a different predetermined button 22a of the push button group 22 is depressed and then the character entry key 33 of the operating dial 23 is rotated to thereby designate a desired character size, typeface or outer frame. It should be noted that when an outer frame is designated, by selecting an option "No outer frame", it is also possible to form a stamp image without any outer frame.

Figure 2:
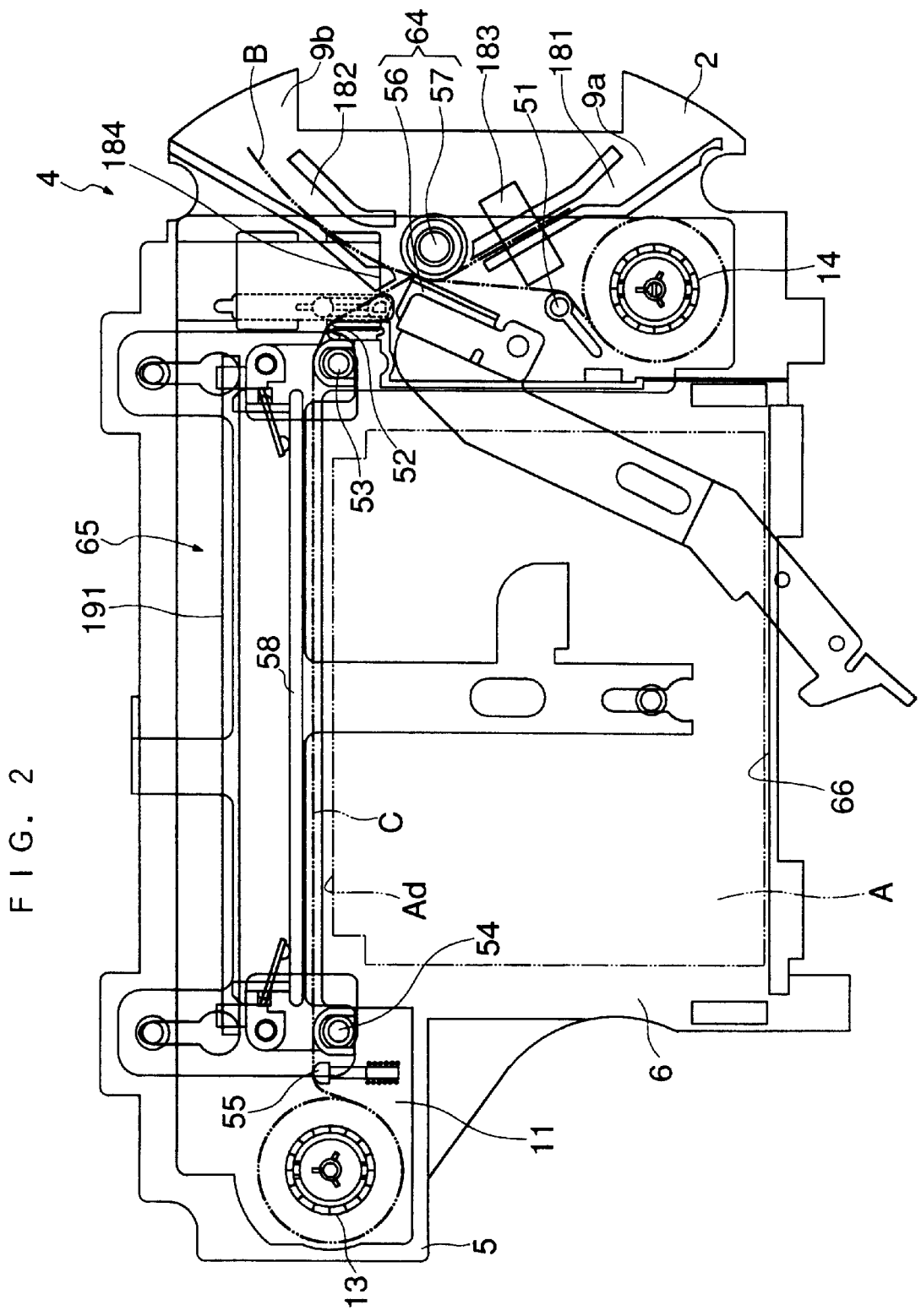
FIG. 2 is a plan view showing an internal construction of a mechanical block of the stamp making apparatus.

Now, a sequence of operations for making a stamp will be briefly described with reference to FIGS. 1A, 1B and 2. First, the function switch 8 is rotated from an "OFF" position as a standby position to an OPEN position to open the lid 7, and a stamp body A is set in the compartment 6. As the stamp body A is set, the type of the stamp body A is detected by a stamp-detecting block 66 connected to the input interface 304 of the control block 300.

Then, the function switch 8 is rotated to the "INPUT/PLATE-MAKING" position to shift the function of the apparatus to plate-making, and the push button group 22 and the operating dial 23 are operated to enter stamp characters. To form a stamp image with an outer frame, a desired outer frame is designated. Thereafter, the plate-making sheet B on which a stamp character label is provided is set by inserting the same into the inserting slot 9a.

Then, a predetermined button 22a of the push button group 22 is operated to cause the apparatus to execute the plate-making operation (plate-making process), i.e. printing of the stamp characters. The printing is effected simultaneously on the ink ribbon C and the plate-making sheet B and a portion of ink coated on the ink ribbon, which defines a stamp image, is transferred to the plate-making sheet B. When the printing is completed, the printed portion of the ink ribbon C is fed or advanced to set the same for exposure to ultraviolet rays, and at the same time the plate-making sheet B is discharged from the take-out slot 9b. When it is confirmed by the plate-making sheet B discharged that there is no error in the printed stamp characters, the function switch 8 is rotated to the "EXPOSURE" position to shift the function of the apparatus to exposure, thereby causing the apparatus to start the exposure.

When the exposure to ultraviolet rays is completed, the function switch 8 is rotated to the "OPEN" position to open the lid 7, and then the stamp body A is removed from the compartment 6 to wash the same. The washing completes the stamp. Before or after completion of the stamp, the stamp character label is peeled off the plate-making sheet B to affix the same to the back of the stamp.

Next, out of the component parts and elements of the stamp making apparatus 1, ones associated with the control block 300, described in detail hereinafter, will be described with reference to FIGS. 2 to 10, one by one.

The ribbon cartridge 11 is constructed such that it is removable from the mechanical block body 5, and it is replaceable together with a casing thereof when the ink ribbon C is used up. As shown in FIG. 2, the ribbon cartridge 11 has a take-up reel 13 arranged at one end thereof and a supply reel 14 arranged at the other end thereof. The ink ribbon C is rolled out from the supply reel 14, fed along a generally L-shaped feed path as viewed in FIG. 2, and taken up by the take-up reel 13. The L-shaped feed path has a shorter side portion which a printer block 64, referred to hereinafter, faces and a longer side portion which the exposure block 65 faces. The printer block 64 faces the ink ribbon C and the plate-making sheet B simultaneously, and the exposure block 65 faces the ink ribbon C printed with the image of the stamp characters.

The ink ribbon C is comprised of a transparent ribbon tape and ink coated on a surface thereof. In the present embodiment, it has a thickness of 6 $\mu$m. When the printer block 64 of the apparatus carries out printing on the ink ribbon C, a portion of ink coated on the ink ribbon, which defines a stamp image, is transferred to the plate-making sheet B, whereby the ribbon tape of the ink ribbon C is formed with a negative stamp image by a transparent portion from which the portion of ink defining the stamp image has been transferred, while the plate-making sheet B is formed with a positive stamp image by the transferred portion of ink defining the stamp image. The printed portion of the ink ribbon C is sent forward to the exposure block 65, where the negative image-formed portion thereof is used as a mask for the exposure, while the plate-making sheet B is delivered from the apparatus for the user to confirm the stamp characters and affix part (label portion) of the plate-making sheet B to the stamp thus made.

Figure 4:
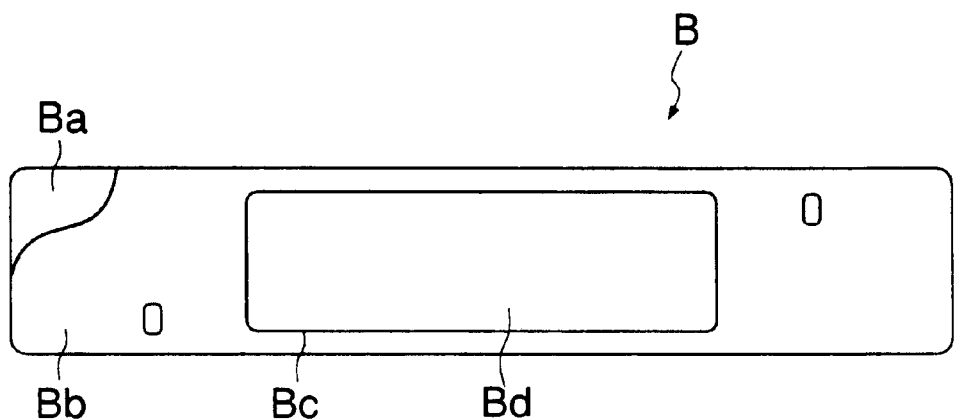
FIG. 4 is a view showing a structure of a plate-making sheet.

As shown in FIG. 4, the plate-making sheet B is a laminate of a base sheet Ba and an adhesive sheet Bb, generally in the form of a strip. The adhesive sheet Bb is formed with cutting lines Bc defining a rectangular area. The rectangular area of the adhesive sheet Bb is peeled of f the base sheet Ba along the cutting lines Bc to form the stamp character label Bd to be affixed to the back of the stamp. There are provided several types of the stamp body A which are different in shape from each other according to the use of stamps, and there are also provided respective corresponding types of the plate-making sheet B which are different in the shape of an area of the stamp character label Bd (shape and size of an area defined by cutting lines).

Figure 3:
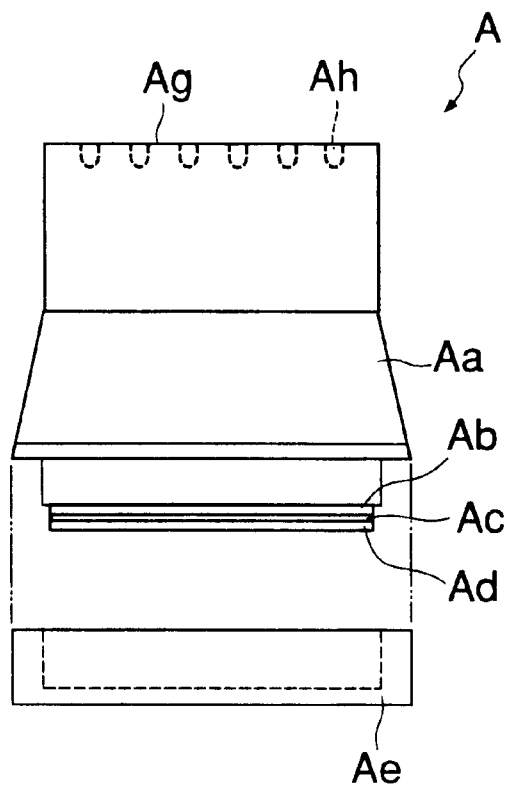
FIG. 3 is a plan view of a stamp body.

On the other hand, as shown in FIG. 3, the stamp body A is comprised of a stock Aa made of resin, a thin sponge Ab (foamed urethane) affixed to a front end of the stock Aa, an ultraviolet-insensitive resin base Ac affixed to the sponge Ab, and an ultraviolet-curing resin affixed to the resin base Ac to form a stamping face Ad. The ultraviolet-curing resin portion (stamping face Ad) of the stamp body A is exposed to ultraviolet rays with the ink ribbon C as a mask, whereby portions of the stamping face Ad corresponding to the stamp characters and the outer frame are cured. In this state, the stamp body A is taken out of the compartment 6, and washed with water to remove uncured portions of the stamping face, which are soluble in water, from the stamping face Ad. Thus, the stamp having a layout of the stamp characters and the outer frame is completed. A symbol Ae in the figure designates a cap made of resin.

Next, the printer block 64 will be described with reference to FIGS. 2 and 11. The printer block 64 includes a head-driving circuit 56a and a motor-driving circuit 57a both of which are connected to the output interface 305 of the control block 300, a print head (thermal head) 56 driven by the head-driving circuit 56a for printing stamp characters on the ink ribbon C, a platen roller 57 driven by the motor-driving circuit 57a for feeding the ink ribbon C in a manner timed to printing operations of the print head 56, and a head surface temperature sensor 56b arranged on a head surface of the print head 56. Further, the casing 2 is formed with a feeding passage 181 through which the plate-making sheet B is fed to a contacting area between the print head 56 and the platen roller 57 and a delivery passage 182 through which the plate-making sheet B is delivered. The feeding passage 181 has an upstream end thereof formed with the inserting slot 9a which is open to the outside of the apparatus, and the delivery passage 182 has a downstream end thereof formed with the take-out slot 9b which is open to the outside of the apparatus.

The platen roller 57 is a drive roller as described above, and when the ink ribbon C is rolled out from the supply reel 14, it pulls in the plate-making sheet B between the same and the print head 56 to thereby bring a portion of the ink ribbon C and a portion of the plate-making sheet B, one upon the other, onto the print head 56. The print head 56 is a thermal head, and thermally transfer ink coated on the ribbon tape of the ink ribbon C to the plate-making sheet B. This transfer of the ink peels portions of ink corresponding to the stamp image off the ink ribbon C to reveal corresponding portions of the transparent base of the ribbon tape, while the peeled portions of the ink are attached to the plate-making sheet B as the stamp image. The head surface temperature sensor 56b is formed by a temperature sensor, such as a thermistor, arranged on a surface of the print head 56 in an intimately contacting manner, and connected to the input interface 304 of the control block 300 for sending information of a temperature of the print head 56 detected thereby.

On the feeding passage 181 faces a sensor 183 which detects insertion of the plate-making sheet B and a feeding reference position of the same. The plate-making sheet B inserted into the feeding passage 181 is sent forward by the platen roller 57 depending on results of the detection of the sensor 183 whereby printing is started from one end of the stamp character label Bd. One of walls defining the delivery passage 182 on a left-hand side as viewed in FIG. 2 is formed with a separating nail 184 at an upstream end thereof, whereby the ink ribbon C and the plate-making sheet B being fed, one upon the other, are separated from each other. Thereafter, the ink ribbon C is sent forward to the exposure block 65, while the plate-making sheet B is delivered via the delivery passage 182 out of the apparatus.

Next, the exposure block 65 will be described with reference to FIGS. 2 and 11. The exposure block 65 includes a light source-driving circuit 191a connected to the output interface 305 of the control block 300, an ultraviolet ray source 191 arranged in a manner opposed to the stamping face Ad of the stamp body A set in the compartment 6 and driven by the light source-driving circuit 191a, and a presser plate 58 arranged between the ultraviolet ray source 191 and the stamping face Ad of the stamp body A. The ultraviolet ray source 191 is a self-heating hot-cathode tube called a semi-hot tube and supported on a fluorescent tube holder, not shown, provided on a base plate, not shown. The stamping face Ad of the stamp body A, the presser plate 58, and the ultraviolet ray source 191 are arranged in a manner parallel to each other with a gap between adjacent ones thereof. The ink ribbon C is fed between the stamping face Ad and the presser plate 58.

The presser plate 58 is formed e.g. of a transparent resin, and moves forward (downward as viewed in FIG. 2) to urge the ink ribbon C against the stamping face Ad of the stamp body A. More specifically, the exposure is carried out by causing the presser plate 58 to urge the ink ribbon C against the stamping face Ad of the stamp body A, and lighting the ultraviolet ray source 191 to thereby irradiate light to the ink ribbon C through the presser plate 58 (see FIG. 5). The exposure block 65 is provided with an ambient temperature sensor 67 which is formed by a thermistor or the like and connected to the input interface 304 of the control block 300, and sends information of a temperature of ambience of the exposure block 65 detected thereby to the input interface 304.

It should be noted that as the presser plate 58 is translated forward, a first guide pin 53 and a second guide pin 54 are moved in the same direction. This movement decreases the tension of the ink ribbon C stretched between the first and second guide pins 53, 54, whereby the ink ribbon C is urged against the stamping face Ad of the stamp body A with reduced tension, i.e. without forming any vertical wrinkles thereon.

Now, the above-mentioned state of the ink ribbon C is described in further detail with reference to FIGS. 2 and 5. Referring to FIG. 2, when the ink ribbon C is fed or advanced, the pulling force of the take-up reel 13 causes strong tension of the ink ribbon C, so that vertical wrinkles are formed on the ink ribbon C due to its very small thickness. Therefore, if the ink ribbon C is urged against the stamping face Ad of the stamp body A as it is, there remain the wrinkles formed on the ink ribbon C urged against the stamping face Ad, so that a deformed (negative) stamp image on the ink ribbon C is used in carrying out the exposure of the stamping face Ad to the ultraviolet rays. On the other hand, if the ink ribbon C is loosened, the exposure can be carried out with the stamp image being out of position. To eliminate these inconveniences, as shown in FIG. 5, the first guide pin 53 and the second guide pin 54 are moved forward in accordance with the forward movement of the presser plate 58, whereby the tension of the ink ribbon C is reduced, and at the same time, a slight stretching force is applied to the ink ribbon C by the tension pin 55, which is moderate enough not to produce any wrinkles on the ink ribbon C.

Figure 5:
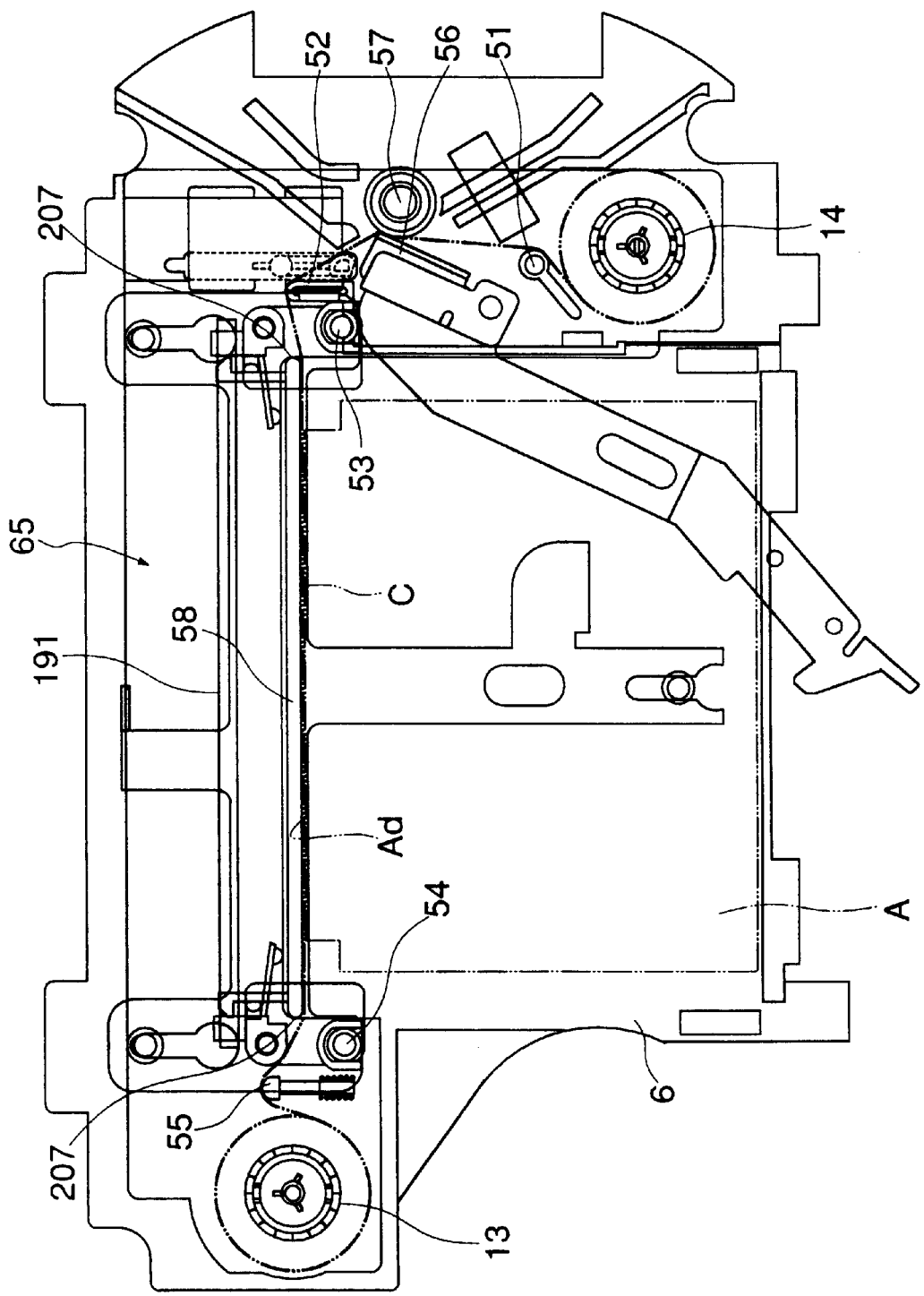
FIG. 5 is a plan view of an exposure system of the mechanical block and component parts associated therewith.

Further, the ink ribbon C in the exposure position shown in FIG. 5 is bent backward at the longitudinal opposite ends of the presser plate 58 by the tension pin 55 and the second path-setting pin 52, and the chamfered portions 207 formed at the longitudinal opposite ends of the presser plate 58 operate to prevent undesired wrinkles from being produced on the ink ribbon C.

As described above, a positive image on the plate-making sheet B and a negative image on the ink ribbon C both formed by the printing are used as a stamp character label and an exposure mask, respectively. That is, the quality of these images directly reflects on the quality of a stamp as a final product. Especially, when the ink ribbon C, which is used as the exposure mask, is deformed, a deformed stamp image is formed on the stamp body by the exposure. To eliminate this inconvenience, in addition to mechanical structural means for regulating the tension of the ink ribbon described above, electrical means of adjusting an amount of heat generated by the exposure process, described hereinafter, is provided to thereby prevent undesired wrinkles from being formed on the ink ribbon C.

Figure 6:
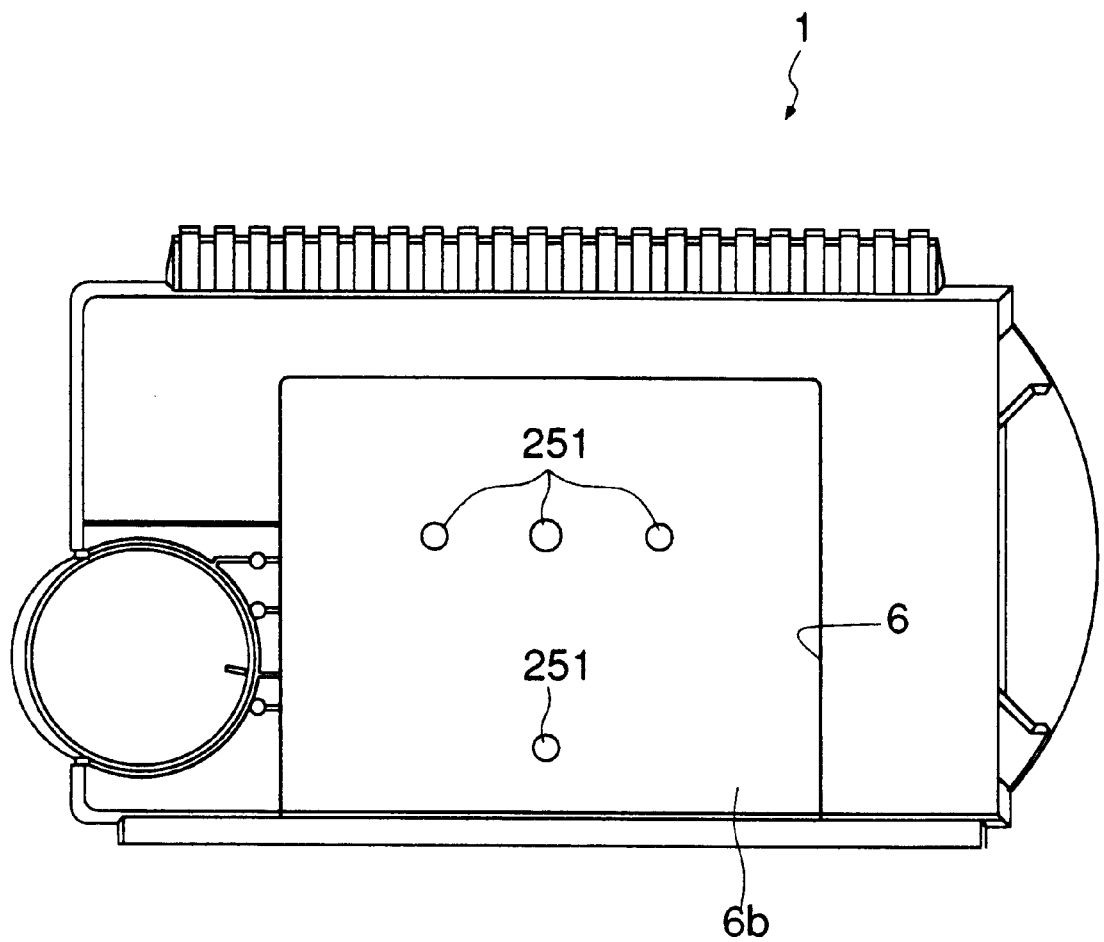
FIG. 6 is a plan view of a compartment of the stamp making apparatus with a lid removed therefrom, and component parts associated with the compartment.

Next, the stamp-detecting block 66, the operation of which is interlocked to the opening and closing of the lid 7, will be described. The stamp-detecting block 66 detects the mounting of the stamp body A in the compartment 6, and at the same time discriminates the type of the mounted stamp body A. The stamp body A includes various types having respective different shapes, e.g. ones for a square stamp, a personal name stamp, a business stamp, an address stamp, etc. The different types of stamp bodies A for respective types of stamps are identical in length (vertical length in FIG. 3), but different in width (horizontal width in the figure) and thickness. To set each of these various types of the stamp bodies A different in width and thickness from each other to a fixed position with respect to the directions of the width and thickness of the stamp body A, in the present embodiment, as shown in FIGS. 6 to 7B, four bosses 251, 251, 251, 251, long and short, are provided on the bottom 6b of the compartment 6 such that they extend perpendicularly upward from the bottom, and the stamp body A is formed with fitting holes Af for fitting corresponding ones of the bosses therein, respectively (see FIGS. 7A and 7B).

Figure 7B:
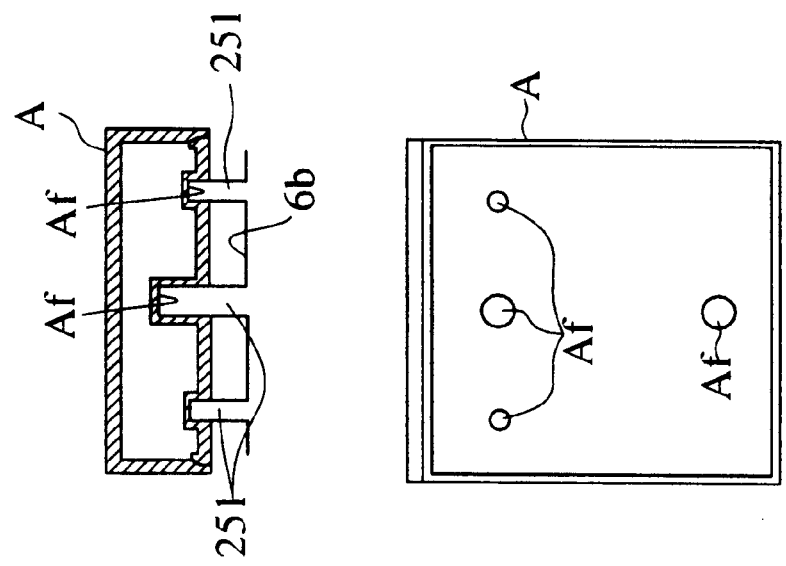
FIGS. 7A and 7B are diagrams which are useful in explaining construction of a stamp body in a state mounted in the compartment.
Figure 7A:
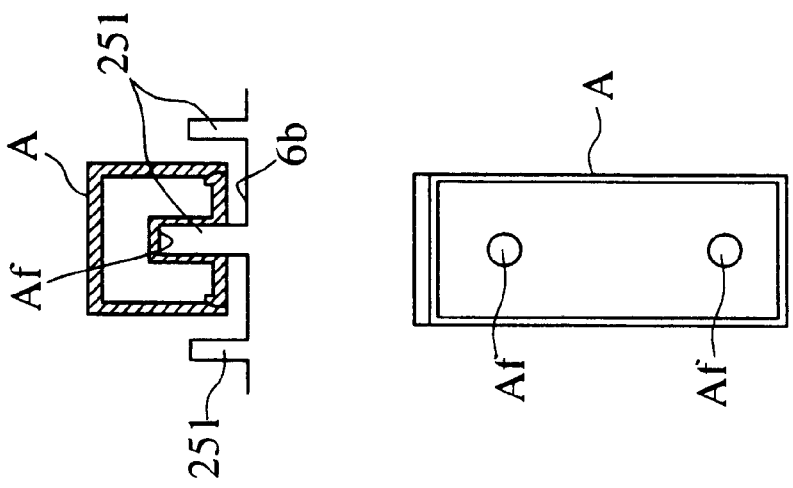

The four bosses 251, 251, 251, 251 are arranged to form a T shape, and in a manner corresponding thereto, a stamp body A for the square stamp, for instance, is formed with two fitting holes Af, Af (see FIG. 7A), and a stamp body A for the business stamp, for instance, is formed with four fitting holes Af, Af, Af, Af (see FIG. 7B). The number of the fitting holes Af and the depth of each of them depend on the type of the stamp body A, and this combination of the fitting holes Af and the bosses 251 enables each stamp body A to be mounted in the compartment 6 such that the center of the stamping face Ad of the stamp body A mounted in the compartment 6 is positioned to a fixed location.

Further, the back surface Ag on the opposite side to the stamping face Ad of the stamp body A is formed with a plurality of small holes Ah (type-detecting holes) arranged side by side at respective central locations in the direction of the width of the stamp body A. The small holes Ah cooperate with a switch array 262 of the stamp-detecting block 66, described hereinafter, to determine the type of the stamp body A (see FIGS. 8A to 8G). The stamp character label Bd of the plate-making sheet B printed with stamp characters and delivered to the outside of the apparatus separately from the ink ribbon C is affixed to the back surface Ag of the stamp body A, whereby the small holes Ah are concealed.

Figure 9:
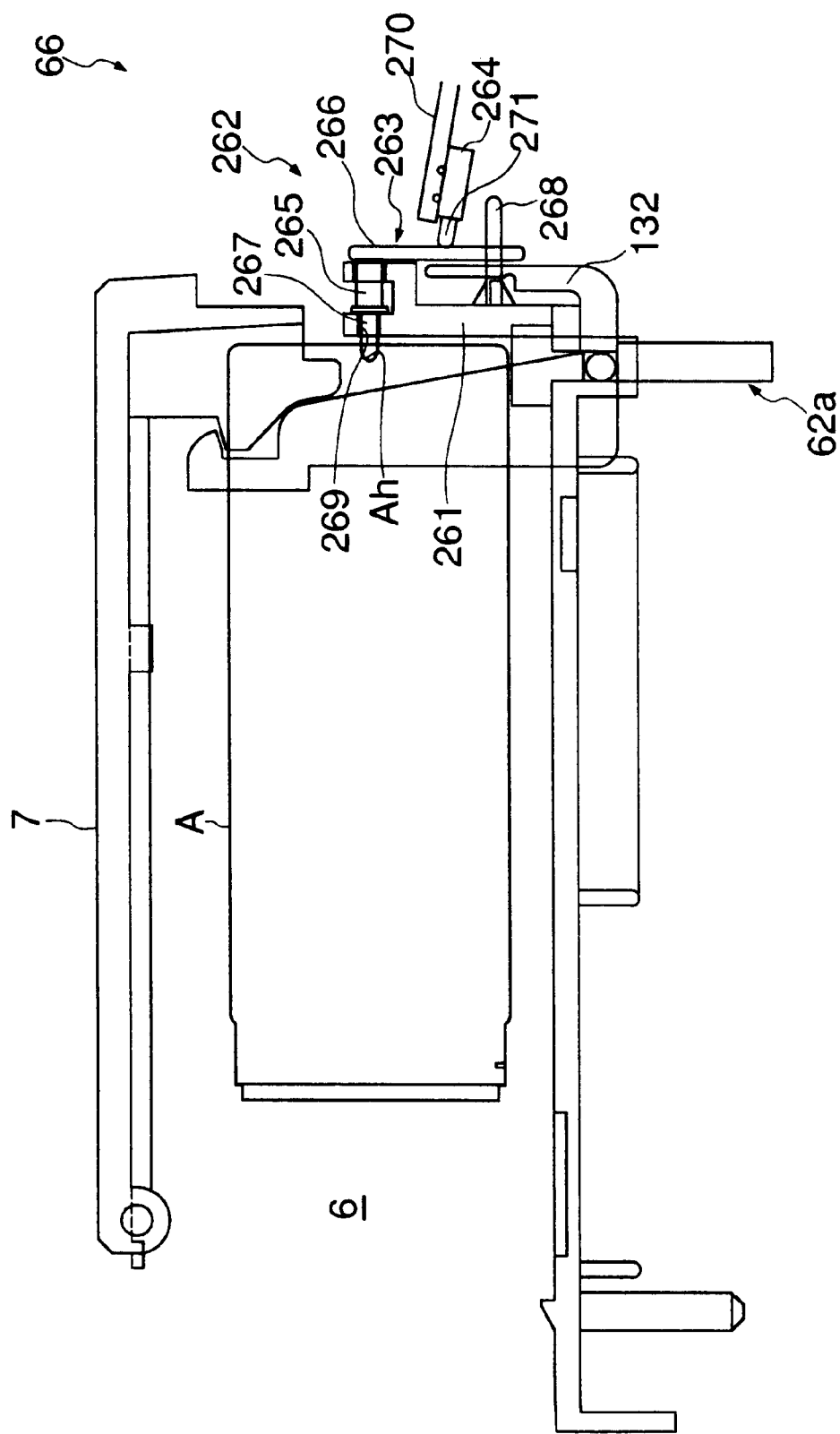
FIG. 9 is a side sectional view which is useful in explaining operations of a stamp-detecting block for detecting a stamp body.
Figure 10:
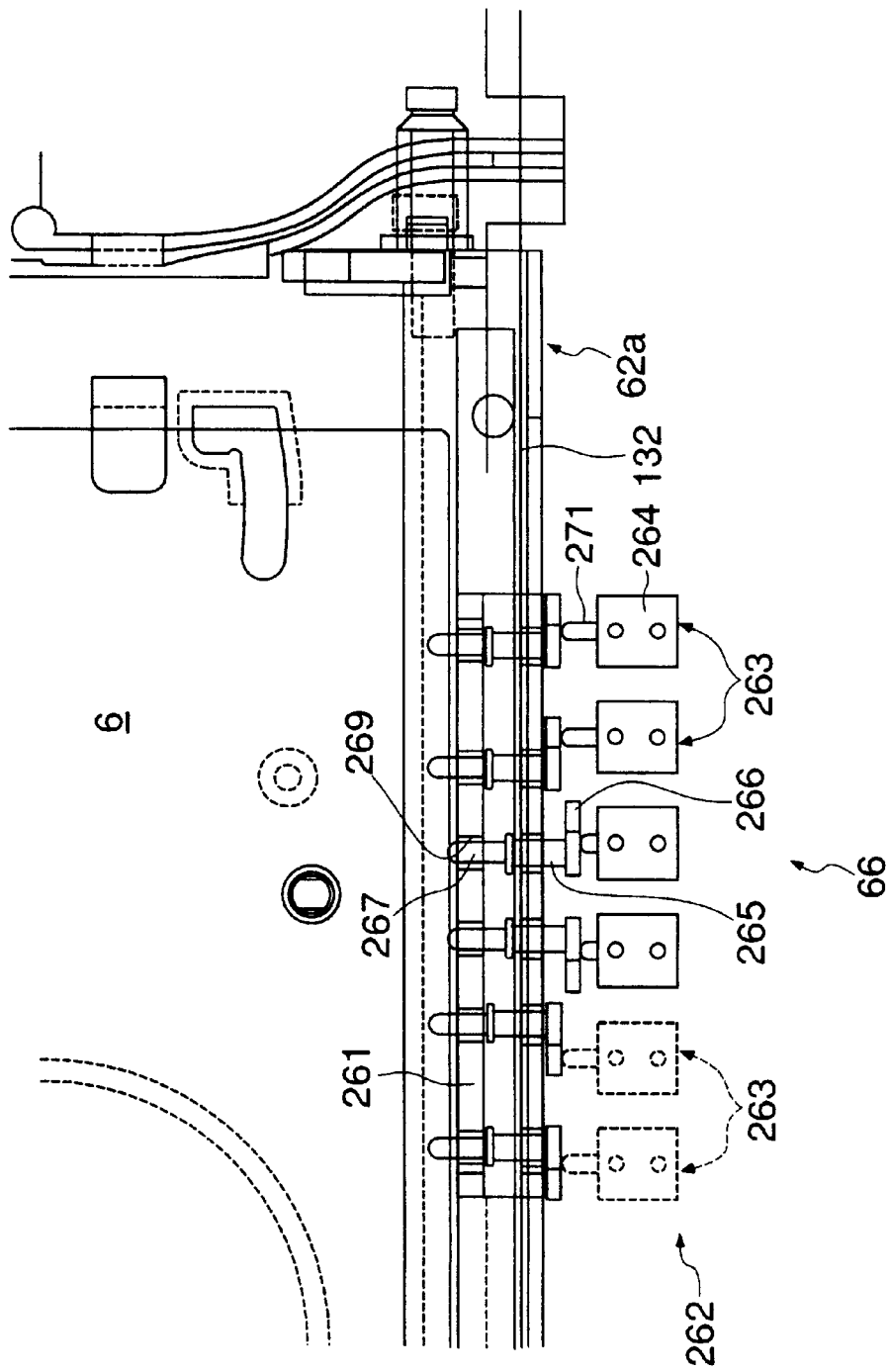
FIG. 10 is a plan view showing the compartment, the stamp-detecting block, and component parts associated therewith.

As shown in FIGS. 9 and 10, the stamp-detecting block 66 includes a switch holder 261 (also serving as a wall of the compartment 6) arranged such that it is opposed to the back surface Ag of the stamp body A when it is mounted in the compartment 6, and the switch array 262 formed of six detecting switches 263 supported on the switch holder 261. Each detecting switch 263 is comprised of a switch body 264 formed e.g. of a push switch, and a switch top 265 having one end for being projected into the compartment 6. The switch top 265 includes a plate portion 266 and a detecting projection 267 (including the one end) extending at right angles to the plate portion 266, with a lower part of the plate portion 266 being guided by a guide projection 268 formed in the switch holder 261 and at the same time the detecting projection 267 being guided by a guide hole 269 formed through the switch holder 261 for forward and backward motions thereof.

The switch body 264 is fixed to the reverse side surface of a base plate 270 such that a plunger 271 thereof abuts the plate portion 266 of the switch top 265. In this embodiment, the plunger 271 urges the switch top 265 toward the compartment 6 by the urging force generated by its spring, not shown. A state of the one end of the detecting projection 267 projected into the compartment 6 via the guide hole 269 through the switch holder 261, and a state of the same being retracted against the urging force of the plunger 271 correspond to ON-OFF states of the detecting switch 263, respectively. Actually, when any of the detecting switches 263 of the switch array 262 is turned on, that is, when the one end of the detecting projection 267 is retracted into the guide hole 269, mounting of the stamp body A is detected, whereas when all of the detecting switches 263 are turned off, that is, when the one end of the detecting projection 267 is projected into the compartment 6, removal of the stamp body A is detected. The detecting switches 263 of the switch array 262 are each in ON or OFF state depending on whether or not a corresponding small hole Ah exists in the stamp body A. Therefore, the type of the stamp body A can be determined from a pattern of ON/OFF states of the six detecting switches 263.

FIGS. 8A to 8G show the relationship between small holes Ah in the stamp body A and the six detecting switches 263 (detecting projections 267). Provision of the six detecting switches 263 for detecting presence or absence of the small holes Ah makes it possible to detect $2^6-1$, i.e. 63 types of patterns. A stamp body A for a square stamp or the like, which is small in width, has no small holes Ah corresponding to two outermost detecting switches 263, 263 on respective opposite sides, and the two detecting switches 263, 263 project into space at opposite locations outside the stamp body A. That is, a stamp body A having a small width, such as a stamp body A for a square stamp, is recognized by a pattern for a stamp body A having imaginary small holes Ah at outermost locations thereof.

Next, the control block 300 will be described with reference to FIG. 11. The control block 300 is formed e.g. by a microcomputer, and includes a CPU 301, a ROM 302, a RAM 303, an input interface 304, an output interface 305, and a system bus 306 connecting all these devices to each other.

The ROM 302 stores various programs, dictionary data for kana-kanji character conversion in the case of the Japanese language type of the apparatus and fixed data, such as font data, i.e. data of characters, symbols, figures or the like, image data of various kinds of outer frames and data of each type of the stamp body A. The RAM 303 is used as a working area and also as means for storing fixed data input by an operator who creates stamps. The data stored in the RAM 303 is enabled to be backed-up even when the power is turned off.

The input interface 304 serves as an interface for taking in signals from the function switch 8, the push button group 22 and the operating dial 23 of the operating block 21, the head surface temperature sensor 56*b* and an optical sensor 183, referred to hereinafter, of the printer block 64, the ambient temperature sensor 67 of the exposure block 65, and the stamp-detecting block 66, via the system bus 306 into the CPU 301 or the RAM 303. On the other hand, the output interface 305 works as an interface for delivering control signals and data for use in control operations, which are received via the system bus 306 from the CPU 301, the ROM 302, and the RAM 303, to the light-emitting elements 12, the display-driving circuit 24*a* of the operating block 21, the head-driving circuit 56*a* of the printer block 64, the motor-driving circuit 57*a*, the light source-driving circuit 191*a* of the exposure block 65, etc.

The CPU 301 is enabled to carry out multitask processing. It carries out the processing based on input signals from the input interface 304, and a processing program stored within the ROM 302 and selected according to the processing on each occasion, using the RAM 303 as the working area, and fixed data stored within the ROM 302 and the RAM 303, as required.

Figure 12:
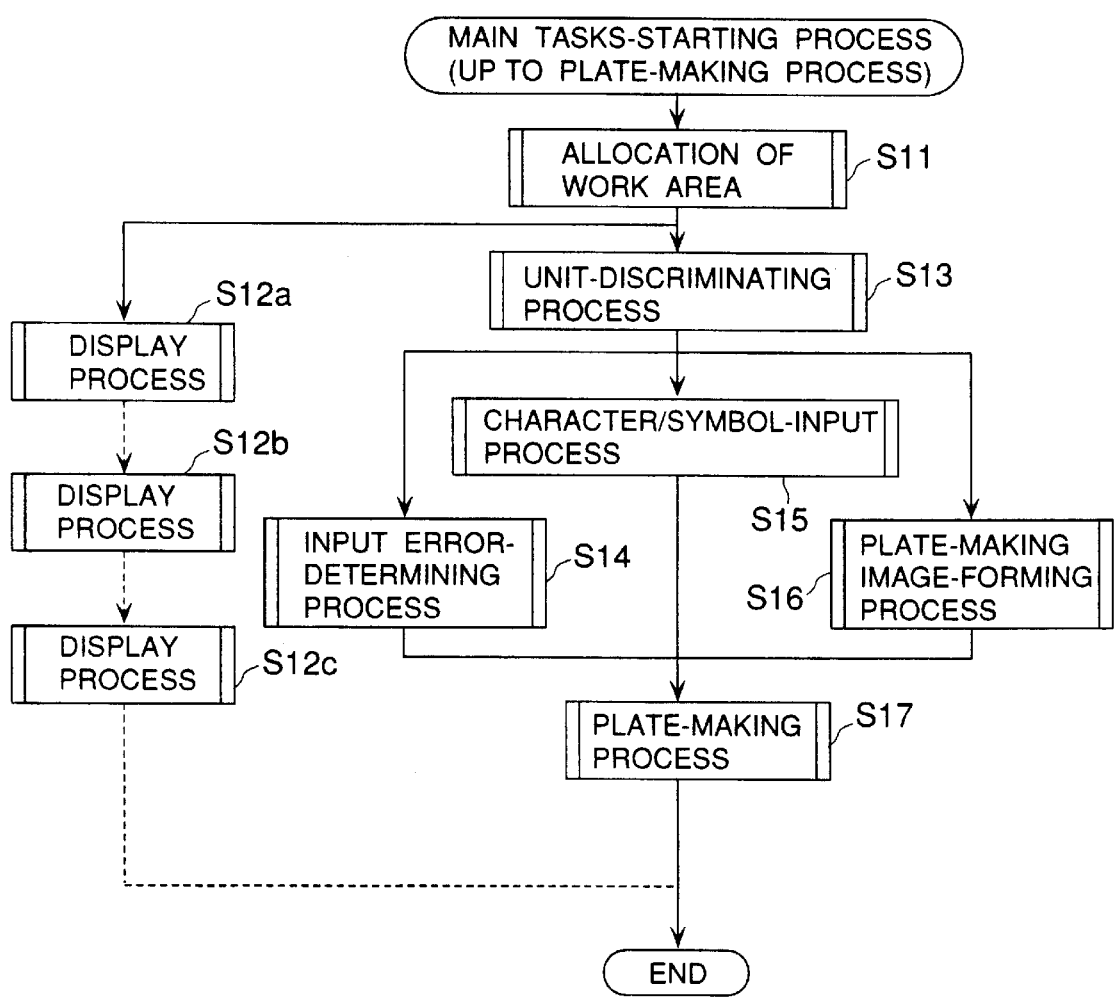
FIG. 12 is a flowchart of an example of main tasks-starting processing executed by the stamp making apparatus.

FIG. 12 shows an example of a main tasks-starting process (a flowchart showing a routine for carrying out the main tasks-starting process up to the plate-making process thereof). As shown in the figure, after a task of the main tasks-starting process is activated, first, a work area is allocated at step S11, and then each task of display processes is activated at step S12*a* (S12*b* and S12*c*) and a task of unit-discriminating process at step S13. Then, a task of an input error-determining process is started at step S14, a task of character/symbol entry process at step S15, a task of a plate-making image-forming process at step S16. The tasks of the above steps (S14, S15 and S16) are simultaneously executed in parallel with each other.

More specifically, after a first entry of stamp characters is effected, and before the following entry of stamp characters is effected at step S15, it is determined at step S14 whether or not there is an inconvenience in the number of characters entered, and a plate-making image is formed at step S16. In the course of executing these steps, if an entry of stamp characters is carried out at step S15, the task of the entry error-determining process (S14) and that of the plate-making image-forming process (S16) are immediately stopped, and then resumed from the start thereof. That is, whenever data of input stamp characters is changed, the above steps (S14, S16) are carried out and a plate-making image is always created based on data of the newest stamp characters before execution of a sheet-making process at step S17.

It should be noted that parallel processing, such as the multitask processing described above, can be realized by forming the program or all the tasks described above through interrupt handling routines and employing an interrupt control circuit which controls the order of priority of interrupts generated.

In the case of the stamp making apparatus 1, the image-forming method and device and the electronic apparatus incorporating the device, according to the invention, are mainly realized by the control block 300, the operating block 21 and the printer block 64. Features of operations executed by the stamp making apparatus 1 will be described with reference to FIGS. 11 to 37B. As described above, stamp characters and an outer frame on the stamping face Ad are created by a stamp image formed on the ink ribbon C and hence the following description will be mainly made of a process for forming a plate-making image for use in producing the stamp image.

Now, by way of a first example, a plate-making image-forming process will be described with reference to FIGS. 13 to 21C, in which a plurality of stamp characters are entered with a ruled line character for dividing the stamp characters at a desired location along the character string and at the same time an outer frame is designated.

Figure 13:
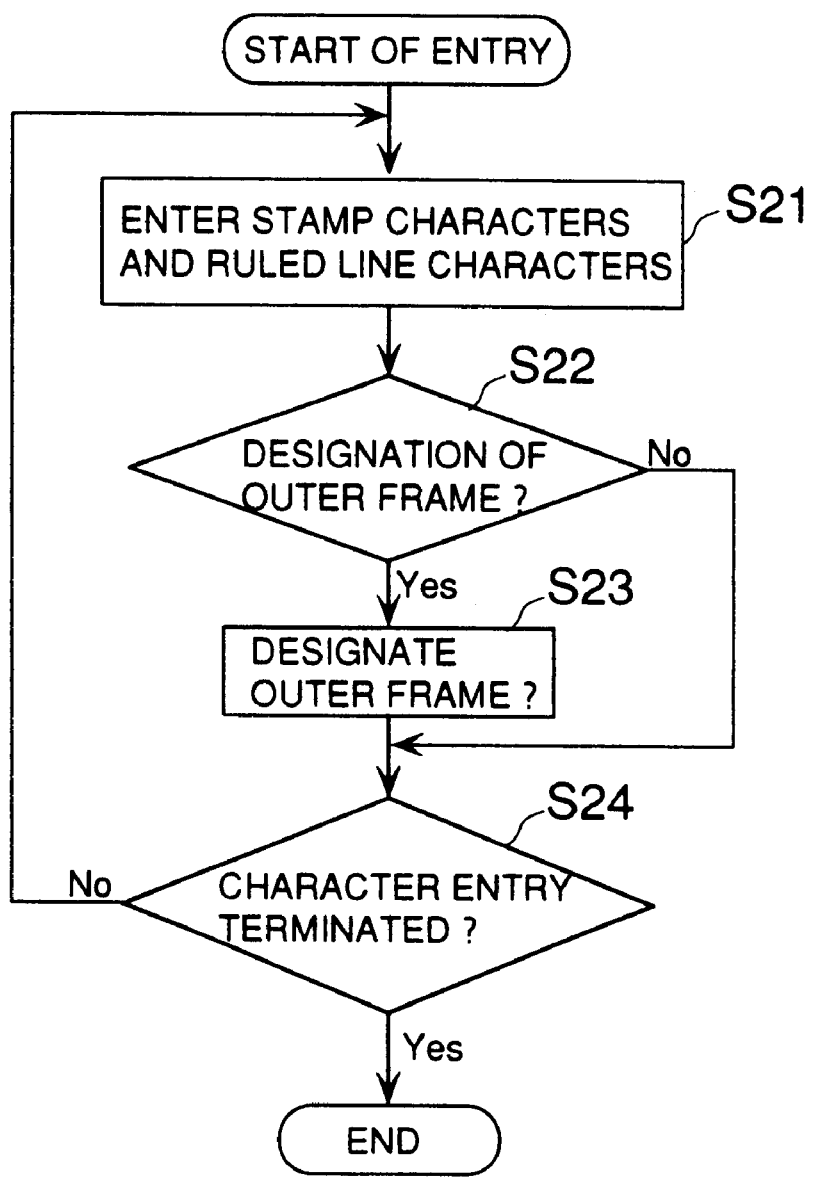
FIG. 13 is a flowchart which is useful in explaining a procedure for entering stamp characters and ruled line characters.
Figure 14A:
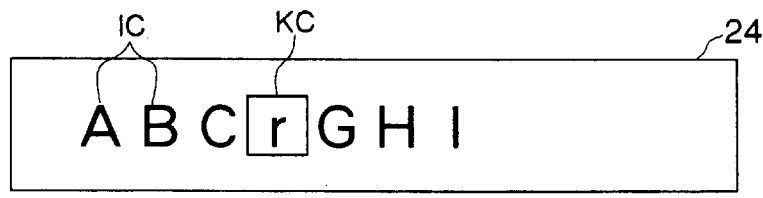
FIGS. 14A to 14E are diagrams each showing stamp characters and a ruled line character displayed on a screen of a display.

FIG. 13 is a flowchart of a procedure for entering stamp characters and a ruled line character(s). When the stamp characters and the ruled line character(s) are entered, as described hereinbefore, the operating dial 23 and the cursor/conversion key 32 are operated as required to thereby enter the desired stamp characters as well as the ruled line character(s) at step S21. Referring to FIG. 14A, when stamp characters IC of "A B C G H I", for instance, are entered together with a ruled line character which is entered between the stamp characters "A B C" and "G H I" to divide them, the ruled line character KC is displayed on the display 24 between the stamp characters "C" and "G" as an image of a letter "r" in a square box. At a location defined by the ruled line character KC, a ruled line character image, referred to hereinafter, is formed in a plate-making image.

Figure 15A:
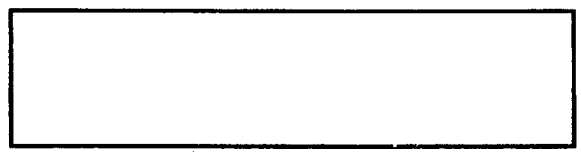
FIGS. 15A to 15C are diagrams each showing an example of an outer frame.
Figure 15B:
Figure 15C:
Figure 16A:
FIGS. 16A to 16B are diagrams each showing an example of an outer frame having a horizontal ruled line therein.
Figure 16B:
Figure 16C:
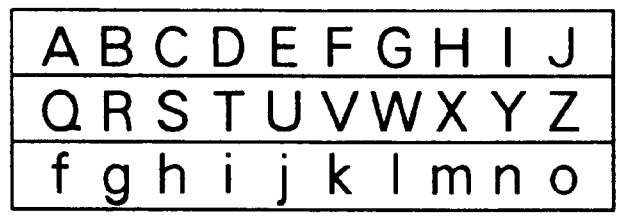
FIG. 16C is a diagram showing an example of an outer frame having a plurality of horizontal ruled lines therein.

Further, an outer frame is designated at steps S22 and S23, after entering the stamp characters IC and the ruled line character KC or in the course of entering the same. The outer frame includes various types which have different outer shapes, as shown in FIGS. 15A to 15C. In this process, instead of designating the outer frame, a table frame may be specified in which a horizontal ruled line or horizontal ruled lines is/are drawn within an outer frame, according to the character size of stamp characters IC input and the number of lines thereof.

Figure 14B:
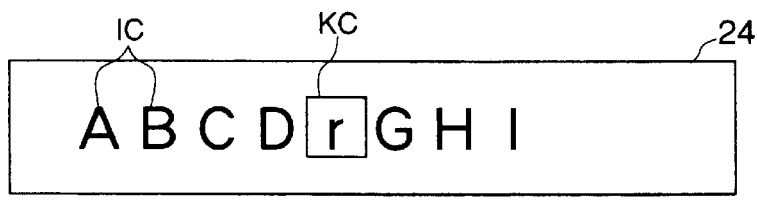
Figure 14C:
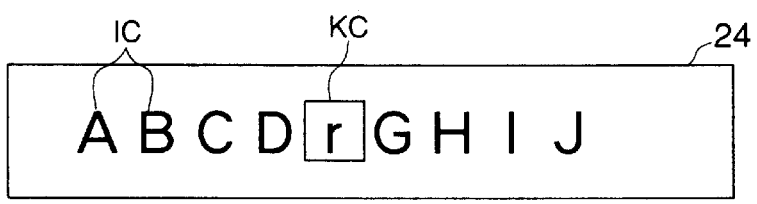

If another stamp character IC or ruled line character KC is entered at step S24, the operating dial 23 and the cursor/conversion key 32 are operated again to input the same, in the same manner as described above. FIG. 14B schematically shows an image of a screen displayed on the display 24 when a stamp character "D" is entered between the stamp character "C" and the ruled line character KC. As shown in the figure, when a stamp character IC is entered forward of the ruled line character KC, the ruled line character KC and the stamp characters "G H I" are moved backward in response to the entry. Further, when a stamp character "J" is entered backward of the stamp character "I" in the above state, a stamp character "J" is added with the stamp characters "A B . . . H I" and the ruled line character KC being left as they are, as shown in FIG. 14C.

If still other stamp characters IC and/or ruled line characters KC are entered backward of the stamp character "J", and the length of the resulting character string becomes larger than that of the display range of the display 24, the sequence of the stamp characters IC and the ruled line character(s) KC is moved forward, that is, leftward in the figure, as a whole, to display the newly-added characters at the right end of the display 24. A ruled line character KC is displayed on the display as an image having the same width as an image of each stamp character (i.e. displayed in an area having the same width and height as a character area of each stamp character), and can be easily deleted, after placing the cursor under the ruled line character KC, by a deleting operation similar to one normally carried out as to a stamp character IC.

Now, a procedure for forming a plate-making image based on entered stamp characters IC, an entered ruled line character KC and a designated outer frame will be described in detail with reference to FIGS. 17 to 21C.

Figure 17:
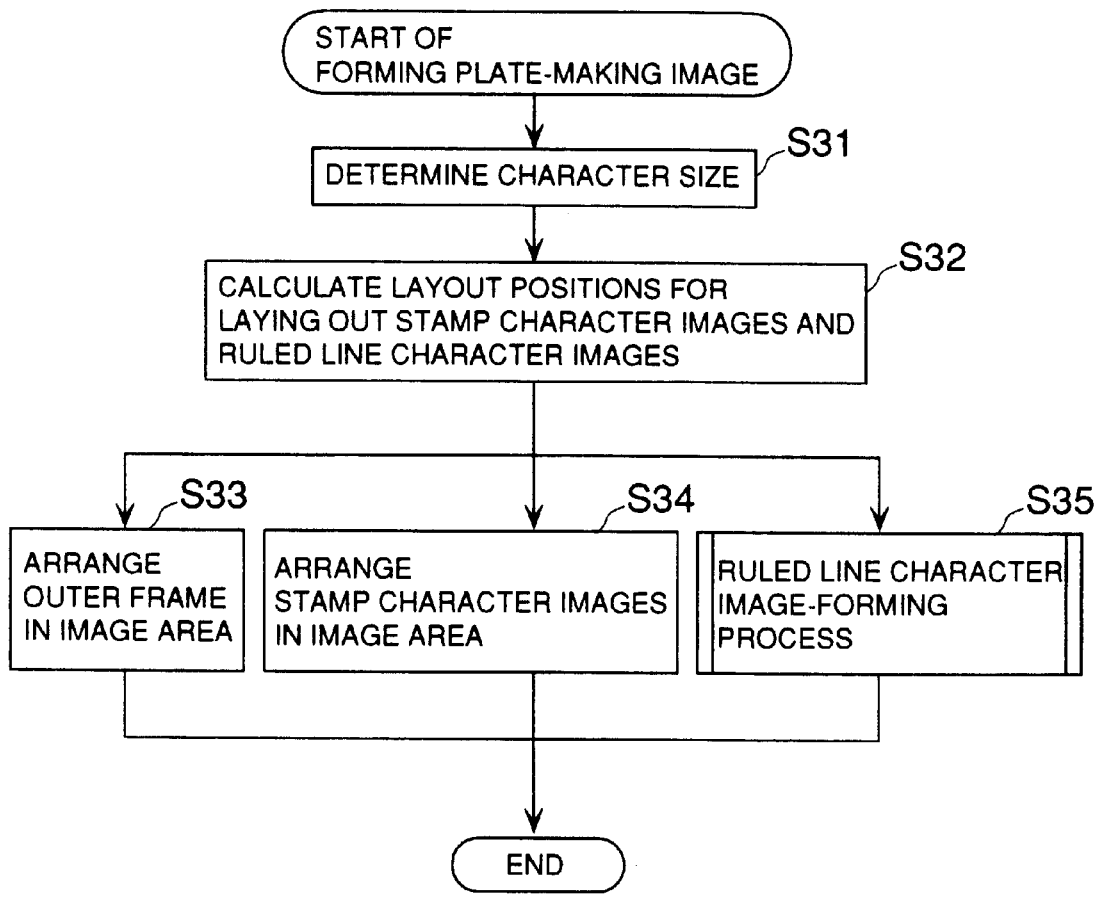
FIG. 17 is a flowchart showing a procedure for carrying out a plate-making image-forming process.

As shown in FIG. 17, first, the character size is determined at step S31 according to the designated outer frame and the number of entered characters, or by a character size specified by the operator. More specifically, the character size of a plate-making image is determined by selecting from various kinds of character sizes stored in the ROM 302 one which does not cause the character string to horizontally extend beyond the left-side and right-side vertical frame portions of the designated outer frame, or alternatively, the same is set to a character size designated by the operator. Available character sizes are shown in the following TABLE 1.

TABLE 1

Character Size Table

| Basic Character Size | Height (Dots) | Width (Dots) | | |
|---|---|---|---|---|
| | | Reduced Size | Normal Size | Expanded Size |
| S | 24 | 18 | 24 | 36 |
| M | 32 | 24 | 32 | 48 |
| L | 48 | 36 | 48 | 72 |
| G | 64 | 48 | 64 | 96 |
| U | 96 | 72 | 96 | 144 |
| H | 120 | 90 | 120 | 180 |

As shown in TABLE 1, the character size table defines six levels of the basic character sizes, S, M, L, G, U and H, according to a dot number of a dot matrix of each character. Each character is formed of a dot matrix which are identical in dot number between the height and width of the character and the character sizes of S, M, L, G, U and H are defined by respective dot matrices of 24, 32, 48, 64, 96 and 120 dots. Further, each character size can be reduced in width to 75% thereof (reduced size) and expanded in width to 150% thereof (expanded size) (see TABLE 1).

Next, the layout positions of the respective entered stamp characters IC and ruled line character KC in a plate-making image-forming area R in the RAM 303 (hereinafter referred to as "the image area") are calculated at step S32. In the following description, an image of a stamp character and an image of a ruled line character, data of both of which are formed in the image area, are referred to as a stamp character image CG and a ruled line character image KG, respectively (see FIGS. 19 to 20E). The stamp character image CG is an image corresponding to an entered stamp character IC data of which is originally stored in the ROM 302, whereas the ruled line character image KG corresponding to an entered ruled line character KC is an image of a division ruled line (vertical ruled line in the present embodiment) created by drawing a line at its layout position calculated.

Then, an outer frame image SG (see FIGS. 20A to 20E) corresponding to the designated outer frame and the stamp character images CG are arranged in the image area R at steps S33 and S34. Further, a ruled line character image KG is formed at the calculated layout position at step S35. Strictly speaking, what is formed or arranged in the image-forming area of the RAM 303 is data of images, but in the following description, for simplicity, the images will be described to be formed, arranged or stored in the image-forming area.

The stamp character images CG are set in advance such that they are uniformly laid out or arranged at equal intervals in a horizontal direction i.e. in the direction of the width of the image area R corresponding to the direction of the width of the stamping face Ad. This makes it possible to produce a stamp having stamp characters formed in a well-balanced manner and prevent the bottom or indented surface of the stamping face Ad from abutting a print material in stamping action.

Figure 19:
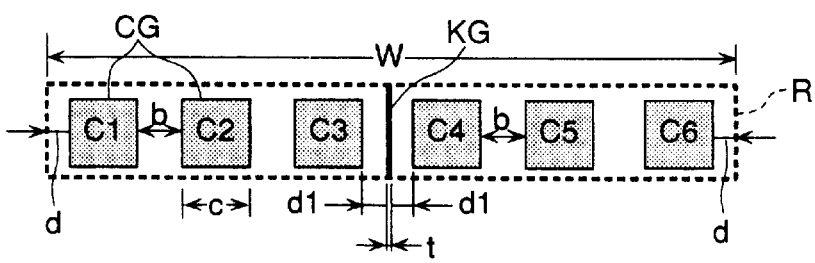
FIG. 19 is a diagram schematically showing an image formed by laying out stamp character images and a ruled line character image in an image area.

Referring to FIG. 19, when the stamp character images CG (C1 to C6) are to be uniformly laid out, if, as shown in the figure, the width of the image area is represented by W, the width of the ruled line character image KG by t, the sum total of the character widths of the respective stamp character images CG (C1 to C6) along the character string by $\Sigma c$ and the number of the stamp characters IC by n (n=6 in the case of FIG. 19), a distance (inter-character distance) b between each pair of stamp character images CG adjacent to each other is calculated by the following equation:

$$b=\{(W-t)-\Sigma c\}/n$$

Further, margins d, d provided forward and backward of the string of the stamp character images CG, respectively, and margins d1, d1 provided forward and backward of the ruled line character image KG, respectively, are both calculated to be half of a value of the inter-character distance b.

More specifically, when the stamp character images CG and the ruled line character image KG each formed based on the FIG. 14A stamp characters IC and ruled line character KC are to be laid out in the image area R, assuming, for instance, that the image area width W is set to 288 dots, the character width c of each stamp character image CG to 24 dots and the width t of the ruled line character image KG to 2 dots, the inter-character distance b between stamp character images CG adjacent to each other becomes equal to 23 dots (b={(288−2)−24×6}/6=23 dots, the remainder=4 dots). In this case, the forward and backward margins d and d1 are both set toll dots(see FIG. 20A). When the calculation of the inter-character distance b, and the margins d, d1 produces remainders, as in the illustrated example, one dot is added to each inter-character distance b sequentially starting from one located between a first pair of adjacent characters (between the character "A" and "B" in the illustrated example) to subsequent ones, in a circulating manner if necessary.

Figure 18:
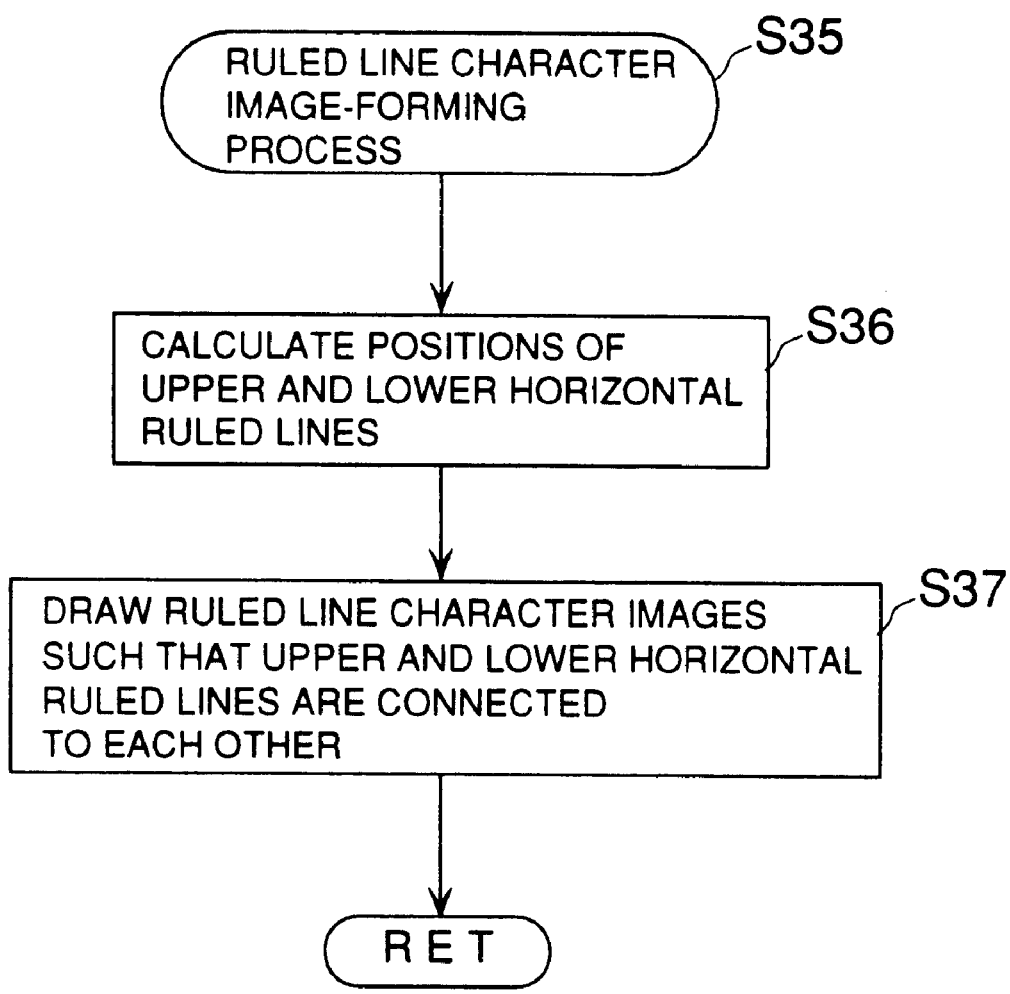
FIG. 18 is a flowchart showing a ruled line character image-forming process.

Thus, the layout positions of the stamp character images CG and the ruled line character image KG are calculated, and based on the results of the calculation, the stamp character images CG are arranged in the image area R, with the ruled line character image KG formed therein. In a process for forming the ruled line character image KG (S35), as shown in FIG. 18, the positions of the upper and lower horizontal frame portions of the designated outer frame or those of the horizontal ruled lines in the case of a table frame being designated (hereinafter the horizontal frame portions of the designated outer frame will be also referred to as "the horizontal ruled lines") are calculated at step S36, and then the ruled line character image KG is formed by drawing a vertical line at the above ruled line character image layout positions in a manner connecting the horizontal ruled lines to each other at step S37. The ruled line character image KG may not be necessarily formed by drawing a vertical line, as described above, it may be also formed by storing one having a predetermined shape in the ROM 302 beforehand and arranging the same at: the above layout positions therefor.

As described above, a plate-making image shown in FIG. 20A is created in response to the entry of the FIG. 14A stamp characters IC and ruled line character KC.

Figure 20A:
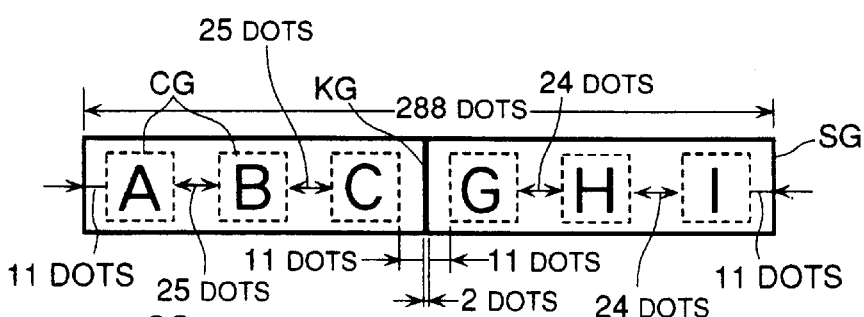
FIGS. 20A to 20E are diagrams each schematically showing an image formed by uniformly laying out character images and a ruled line character image in a fixed-length image area.
Figure 20B:
Figure 20C:
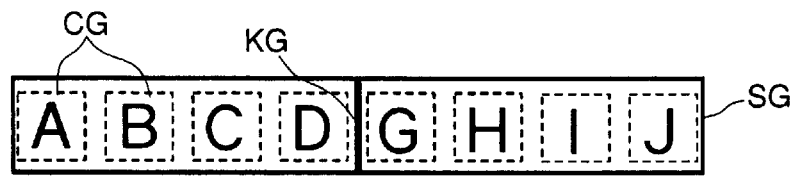

Further, when the stamp character "D" is added to the FIG. 14A stamp characters IC and ruled line character KC as shown in FIG. 14B, a ruled line character image KG in FIG. 20B is formed in accordance with the addition of the stamp character "D" at a position moved backward from the position of the FIG. 20A ruled line character image KG (toward the end of the character string). That is, in the present example, each stamp character image CG is uniformly laid out at equal intervals in the image area R as described above, so that when a new stamp character IC is added thereto, layout positions of the stamp character images CG as well as a layout position of the ruled line character image KG are calculated again. Therefore, if a new stamp character IC is added at a position forward of the ruled line character KC (toward the head of the character string), as described above, the ruled line character image KG in a plate-making image is formed at a position moved backward from the position where it was located before the addition of the stamp character, in accordance with the addition of the stamp character. Inversely, when the stamp character "J" is added at a position backward of the ruled line character KC as shown in FIG. 14C, the ruled line character image KG is formed at a position moved forward of the position where it was located before the addition of the stamp character "J" (see FIG. 20B), as shown in FIG. 20C.

The inter-character distance b between the stamp character images CG in the plate-making image shown in FIG. 20B becomes equal to 16 dots (={(288−2)−24×7}/7) and the margin d and d1 both have 8 dots. Further, the inter-character distance b between the stamp character images CG in a plate-making image shown in FIG. 20C becomes equal to 11 dots (={(288−2)−24×8}/8) before addition of the remainders and the margin d and d1 both have 5 dots.

Also when a stamp character IC once entered is to be deleted, inversely to the addition of a stamp character IC, the ruled line character image KG in a plate-making image is moved along the character string in accordance with the deletion. That is, inversely to the above case, after entering the stamp "A B . . . J" and the ruled line character KC, as shown in FIG. 14C, if the stamp character "J" is deleted, the ruled line character image KG in the plate-making image in FIG. 20C is moved to a position backward of the position where it was located before the deletion of the stamp character "J", as shown in FIG. 20B. Further, when the stamp character "D" is deleted from the FIG. 14B stamp character IC, as viewed in FIG. 14A, the ruled line character image KG in the plate-making image in FIG. 20B is moved to a position forward of the position where it was located before the deletion of the stamp character "D", as shown in FIG. 20A.

As described above, in accordance with the addition or deletion of a stamp character IC, the position of the ruled line character image KG in the above image area is moved along the character string.

Further, when a stamp character IC is added and the stamp character images CG with an added one are arranged in the image area R, if the string formed by arranging the stamp character images CG together with an image of the added stamp character IC in their original character size extends beyond the image area R, it is possible to reduce the string of the stamp character images CG in size such that the same is formed within the image area R. That is, when the stamp character images CG are laid out by setting the inter-character distance b to 0, if the length of the whole string of the stamp character images CG is larger than the width of the image area R, each stamp character image CG can be reduced in size.

Figure 14D:
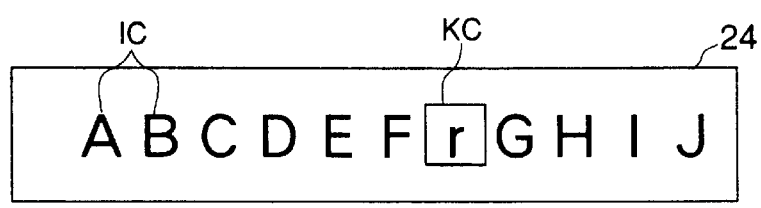
Figure 20D:
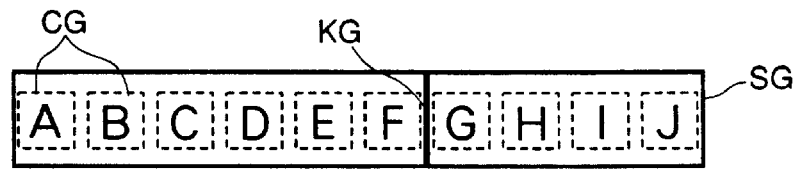
Figure 20E:

For instance, as shown in FIG. 14D, when stamp characters "E F" are added at respective positions forward of the ruled line character KC, and the stamp character images CG including ones of the added stamp characters are laid out in the image area R in their original character size, e.g. in the size L (character width: 48 dots), if the string of the stamp character images CG extends beyond the image area R, the size of each stamp character image CG is changed to a reduced size (character width: 36 dots) and then the stamp character images CG are laid out in the image area R in the reduce size (see FIG. 20D). If the string of the stamp character images CG still extends beyond the image area R even after changing the original character size to the reduced size, the character size is changed to a further reduced one, that is, from the size L to the size M (character width: 32 dots) in the above case.

Figure 14E:
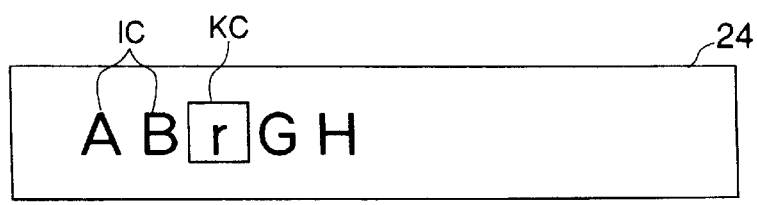

Inversely, when the stamp character images CG can be laid out in the image area R in a character size larger than their original character size as results of the deletion of a stamp character or stamp characters IC, it is also possible to increase the size of each stamp character image CG. For instance, as shown in FIG. 14E, after the stamp character "C D E F" and "I J" are deleted from the stamp characters "A B . . . J" in FIG. 14D, if even stamp character images CG having an expanded size (character width: 36 dots) with respect to their original size, e.g. the size S (character width: 24 dots), can be laid out in the image area R, the character size is changed to the expanded size. Further, if the string of stamp character images CG each expanded to the above expanded size still extends beyond the image area R, but stamp character images CG each expanded to the size M (character width 32 dots) larger than the size S can be laid out within the image area R without extending beyond the same not only in character width but also in character height (32 dots), the character size is changed from the size S to the size M.

When stamp character images CG produced in a reduced or expanded (changed) character size as described above are laid out in the image area R, the ruled line character image KG is formed in a predetermined layout position moved in accordance with the layout of the stamp character images CG.

It should be noted that the apparatus may be configured such that, in the above case where a stamp character(or stamp characters) IC are added or deleted and the character size is reduced or expanded, only stamp character images CG which exist in a divisional area divided by the ruled line character KC where the stamp character(s) IC is/are added or deleted, are reduced or expanded in size. In this case, the layout position of the ruled line character image KG is a position set before adding or deleting the stamp character(s) IC.

Figure 21A:
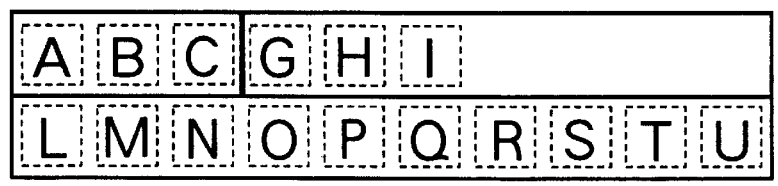
FIG. 21A is a diagram schematically showing an image formed by laying out stamp character images and a ruled line character image in a fixed length image area by a "forward alignment layout method"
Figure 21B:
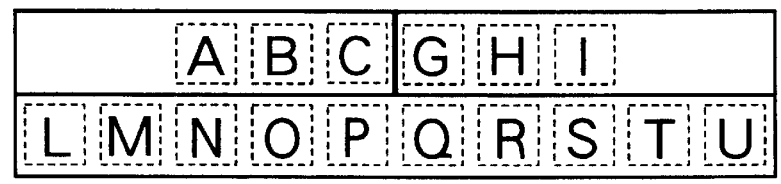
FIG. 21B is a diagram schematically showing an image formed by laying out stamp character images and a ruled line character image in a fixed length image area by a "center alignment layout method"
Figure 21C:
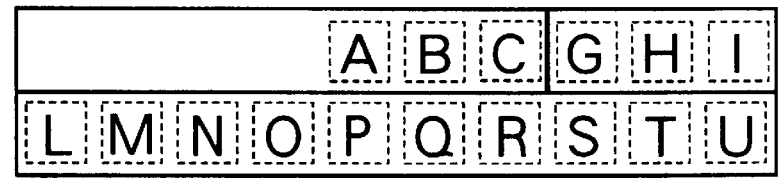
FIG. 21C is a diagram schematically showing an image formed by laying out stamp character images and a ruled line character image in a fixed length image area by a "backward alignment layout method"

Although in the above embodiment, description has been made of the case in which stamp characters are uniformly laid out, this is not limitative, but it is also possible to adopt as a layout method any of a "forward alignment layout method" which moves each string of stamp character images to a location closer to the forward end of an image area R (see FIG. 21A), a "center alignment layout method" which aligns the central portion of each string of stamp character images at a center of the image area R (see FIG. 21B) and a "backward alignment layout method" which moves each string of stamp character images to a location closer to the backward end of the image area R (see FIG. 21C). However, assuming that a plurality of lines of stamp characters are input, the inter-character distance between the stamp character images CG in each of the above cases is set to an inter-character distance between stamp character images CG of a line having the larger (largest) number of characters, which are uniformly laid out. This makes it possible to create a well-balanced plate-making image as a whole, even when a plurality of lines of stamp characters IC are entered.

As described above, according to the first example, when a stamp character IC is newly added to or deleted from the entered stamp characters IC and ruled line character KC, the stamp character images CG and ruled line character image KG formed after the addition or deletion are uniformly laid out, whereby it is possible to form a plate-making image in which the stamp character images CG are arranged in a fixed-length image area R in a well-balanced manner. Further, in accordance with the addition or deletion of stamp characters IC, the character size of stamp character images CG is changed as required, which makes it possible to produce a plate-making image having stamp character images CG well-balanced in size. Furthermore, according to the addition or deletion of stamp characters IC, the ruled line character image KG is created in a suitable layout position moved along the character string, which eliminates the need to carry out a special operation for adjusting the layout position of the ruled line, thereby enabling a plate-making image having a ruled line to be formed with ease.

Next, by way of a second example, a plate-making image-forming process in which stamp characters are entered between a pair of ruled line characters will be described with reference to FIGS. 22A to 23B. In this example, it is assumed that an outer frame is not designated.

Figure 22A:
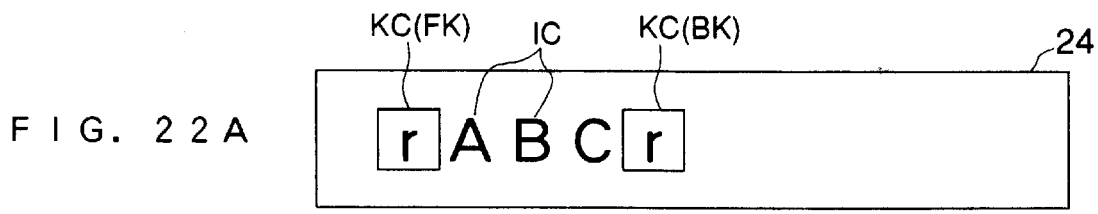
FIGS. 22A and 22C are diagrams each schematically showing a screen displaying stamp characters entered between a pair of ruled line characters.
Figure 22B:
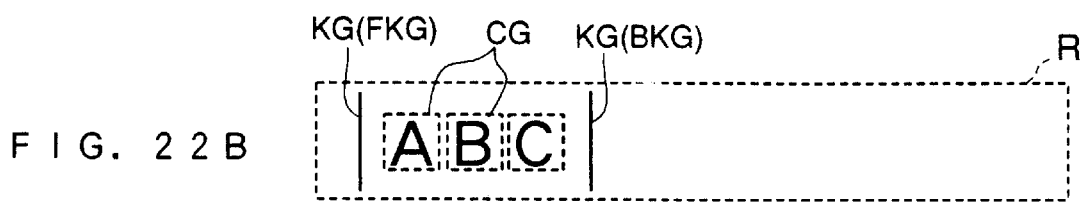
FIGS. 22B is a diagram showing an image corresponding to FIG. 22A., which is formed by laying out the ruled line character images and stamp character images in an image area.

FIG. 22A schematically shows an image of a pair of ruled line characters KC (FK), KC (BK) and stamp characters "A B C" entered between them, which is displayed on the display screen. When a plate-making image is formed by the stamp characters IC and the pair of ruled line characters FK, BK, entered as above, stamp character images CG and a pair of ruled line character images FKG, BKG, shown in FIG. 22B, are formed in an image area R. The ruled line character images FKG, BKG are created such that each of them has approximately the same length as the vertical width of the image area R (length in the vertical direction in FIG. 22B).

Figure 22C:
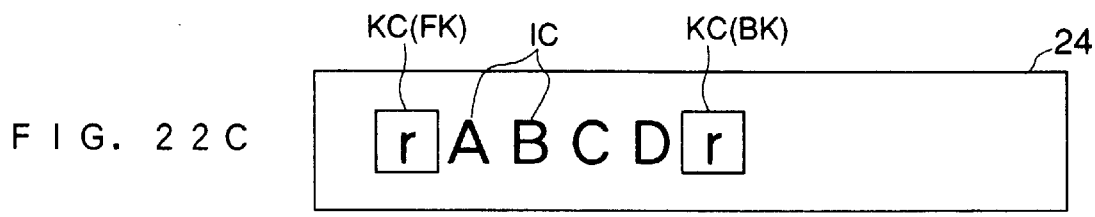
Figure 22D:
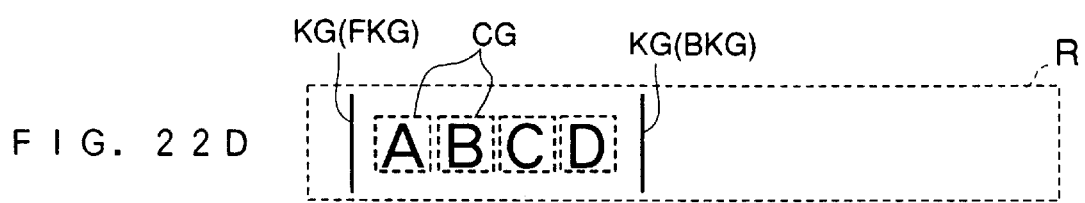
FIG. 22D is a diagram similar to FIG. 22B, which corresponds to FIG. 22C.

When, as shown in FIG. 22C, the stamp character "D" is added to the stamp characters IC and the ruled line characters FK, BK, entered as above, at a position forward of the ruled line character BK, a ruled line character image BKG on a string tail side is formed at a position moved backward from a position where it was located before the addition of the stamp character "D", as shown in FIG. 22D. Inversely, after the stamp characters "A B C D" and the ruled line characters FK, BK are entered as shown in FIG. 22C, when the stamp character "D" between the ruled line characters FK, BK is deleted, a plate-making image shown in FIG. 22D has the ruled line character image BKG formed at a position moved forward from a position where it was located before the deletion of the stamp character "D", as shown in FIG. 22B.

As described above, in accordance with the addition or deletion of stamp characters IC, the string tail-side ruled line character image BKG is formed at a predetermined layout position, which is moved along the character string. To this end, shifting means according to the invention is comprised of the CPU 301, the ROM 302, the RAM 303 and a program for forming ruled line character images KG at predetermined positions.

Figure 23A:
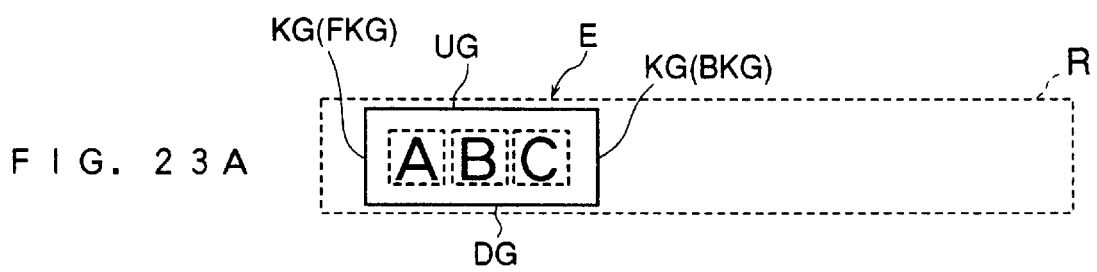
FIGS. 23A and 23B are diagrams each schematically showing an image formed by connecting upper ends and lower ends of a pair of ruled line character images to each other.

Further, in this example, it is possible to connect the opposite ends (upper and lower ends) of the ruled line character image FKG to respective opposite ends of the ruled line character image BKG to thereby create a frame (surrounding frame) that surrounds the stamp character image CG. If such a surrounding frame is desired to be formed, one of the predetermined buttons 22*a* is operated to instruct the apparatus to produce the surrounding frame. In response the instruction, a layout position for each of the ruled line character images FKG, BKG is calculated, and, as shown in FIG. 23A, connection lines are drawn such that the upper ends of the ruled line character images FKG, BKG are connected to each other and the lower ends thereof are connected to each other by respective images UG, DG of connection ruled lines (connection ruled line images). To this end, connecting means according to the invention is comprised of the CPU 301, the ROM 302, the RAM 303 and a program for drawing the connection ruled line images UG, DG.

The connection ruled line images UG, DG can be extended or shortened on a ruled line character image BKG side in accordance with the addition or deletion of stamp characters IC. That is, as described above, in accordance with the addition or deletion of stamp characters IC, the string tail-side ruled line character image BKG is moved along the character string, so that in accordance with the movement, the layout position of each of the ruled line character images FKG, BKG is calculated again and based on the results of the calculation, the connection ruled line images UG, DG are drawn again.

As a result, the surrounding frame E formed by the pair of ruled line character images FKG, BKG and the connection ruled line images UG, DG is expanded or reduced along the character string in accordance with the addition or deletion of stamp characters IC.

Figure 23B:
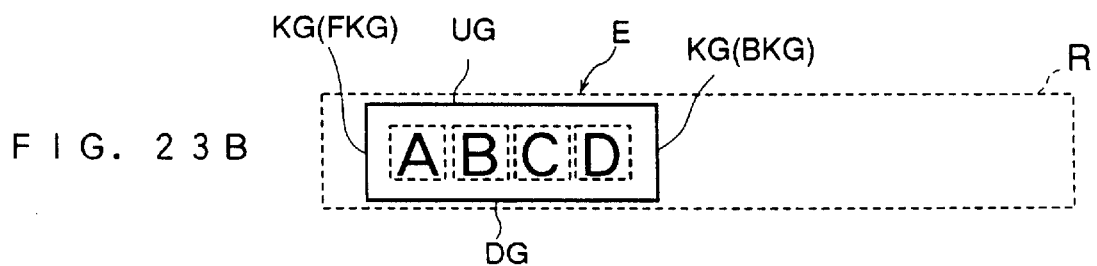

Although in FIGS. 23A and 23B, the surrounding frame E is formed in a manner surrounding all the input stamp characters IC, if the ruled line characters FK, BK are inserted at respective desired positions in the character string of the stamp characters IC to define desired stamp characters IC to be surrounded, a surrounding frame can be formed, which surrounds only the desired stamp characters IC.

The stamp making apparatus 1 can create a surrounding frame by directly designating the creation of the same without inputting the above ruled line characters FK, BK. That is, when the predetermined button 22*a* for producing a surrounding frame is depressed, a surrounding frame surrounding all the stamp character images CG of entered stamp characters IC is created. This surrounding frame is formed similarly to the case of the above ruled line characters FK, BK entered forward and backward of the string of the stamp characters IC.

Also in this case, as a stamp character IC is newly added to or deleted from designated stamp characters IC, the surrounding frame is expanded or reduced. Further, as desired stamp characters are designated to instruct the apparatus to create a surrounding frame, it is also possible to form a surrounding frame that surrounds only the desired stamp characters IC out of all the input stamp characters IC.

As described above, according to the second example, even when a stamp character IC is newly added to or deleted from stamp characters IC entered between a pair of ruled line characters FK, BK, a string tail-side ruled line character image BKG is formed at a position moved toward a string tail or a string head in a manner interlocked with the addition or deletion of the stamp characters IC. Therefore, the operator can freely add or delete stamp characters IC without being required to be conscious of the maximum enterable character number and a blank generated after the deletion of stamp characters IC, whereby it is possible to easily form a plate-making image having stamp character images CG defined by ruled lines (ruled line character images) drawn at respective positions forward and backward thereof. Further, ruled line character images KFG, BKG are connected to connection ruled line images UG, DG and moreover the connection ruled line images UG, DG are extended or shortened in a manner interlocked with the addition or deletion of stamp characters IC, so that the operator can freely add or delete a stamp character IC without being required to be conscious of the size of a surrounding frame.

Next, by way of a third example, a plate-making image-forming process in which stamp characters and ruled line characters are entered while instructing underlining of images of the stamp characters will be described with reference to FIGS. 24A to 28.

Figures 24A, 24B, 24C:
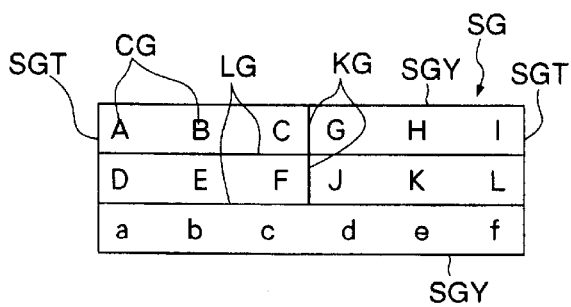
FIGS. 24A to 24C are diagrams, which are useful in explaining a third example of the present embodiment, wherein desired stamp characters and ruled line characters are entered in an image area to underline part of the stamp characters, with entry screens displayed on the display, shown on the left-hand side as viewed in the figures, and plate-making images formed by the entry and settings, shown on the right-hand side, as viewed in the figures (the same applies hereinafter)

FIGS. 24A to 24C are diagrams useful in explaining the plate-making image-forming process in which desired stamp characters and ruled line characters entered while the stamp characters are set to be underlined. On the left-hand side in the figures are shown entry screens displayed on the display 24, whereas on the right-hand side in the figures are shown plate-making images formed based on the entry and settings, respectively. Further, numerals "1", "2" and "3" each within a square box in the entry screen show line numbers of lines on which stamp characters IC (stamp character images CG) and ruled line characters KC (ruled line character images KG) are entered.

To set underlining of stamp characters IC, the operational mode is changed over from an entry mode to an underline setting mode, and an underline-designating character UK i.e. a delta mark is entered immediately before a desired stamp character, as shown in FIGS. 24A to 24C. When the underline-designating character UK is entered, an underline image LG is formed or drawn through a character area of a stamp character image CG of each of stamp characters following the underline-designating character UK, in each plate-making image. Further, the underline image LG drawn under each stamp character image CG has an end or ends thereof on a ruled line character image KG side or/and on a side of a vertical frame portion SGT of an outer frame image SG extended to the ruled line character image KG or/and the vertical frame portion SGT, whereby the end or ends of the underline image LG is/are connected to the ruled line character image KG or/and the vertical frame portion SGT, when the stamp character image CG is arranged adjacent to the ruled line character image KG or/and the vertical frame portion SGT.

More specifically, in setting the underlining of stamp characters IC, first, it is determined whether or not the stamp character image CG under which an underline image LG is to be drawn is arranged adjacent to the ruled line character image KG or/and the vertical frame portion SGT of the outer frame image SG. When it is determined that the stamp character image CG is arranged adjacent to the ruled line character image KG or/and the vertical frame portion SGT, a layout position or layout positions of the ruled line character image KG or/and the vertical frame portion SGT is/are calculated, and based on the result of the calculation, an underline image LG is drawn such that it is connected to the ruled line character image KG or/and the vertical frame portion SGT. To this end, underline-extending means according to the invention is comprised of the CPU 301, the ROM 302, the RAM 303 and a program for forming an underline image LG.

Now, with reference to FIGS. 24A to 28, description will be made more specifically of a case where entered stamp characters IC are set to be underlined. First, in FIG. 24A, the stamp characters "A B C G H I" on a first line and "D E F J K L" on a second line are set to be underlined. Further, ruled line characters KC are entered between the stamp characters "C" and "G" on the first line and between the stamp characters "F" and "J" on the second line.

In a plate-making image formed through the above entry and settings, each of underline images LG drawn through the character areas of the stamp character images "A", "I", "D" and "L" adjacent to the vertical frame portions SGT of the outer frame image SG has an end thereof extended to one of the vertical frame portions SGT for connection. On the other hand, each of underline images LG drawn through the character areas of the stamp character images "C", G "F" and "J" adjacent to the ruled line character images KG has an end thereof extended to an adjacent one of the ruled line character images KG for connection. Further, in this example, the stamp character images CG on the first line are set to be identical in size and number to those on the second line, and hence the ruled line character images KG, KG on the first and second lines are arranged at an identical position in the direction along the character strings to form a straight line. In addition, an upper end of the ruled line character image KG on the first line is connected to an upper horizontal frame portion SGY of the outer frame image SG.

The stamp character entry and the underline settings shown in FIG. 24B is distinguished from those in FIG. 24A in that the underline-designating character UK is entered after the stamp character "C". Therefore, in this case, as shown in FIG. 24B, the underline image LG is not drawn under the stamp character images "A B C" but only under the stamp character images "G H I", in the plate-making image.

Further, the stamp character entry and underline settings shown in FIG. 24C is distinguished from those in FIG. 24B in that the underline-designating character UK is entered after the stamp character "F". Therefore, in this case, as shown in FIG. 24C, the underline image LG is not drawn under the stamp character images "D E F" but only under the stamp character images "J K L", in the plate-making image.

Figure 25A:
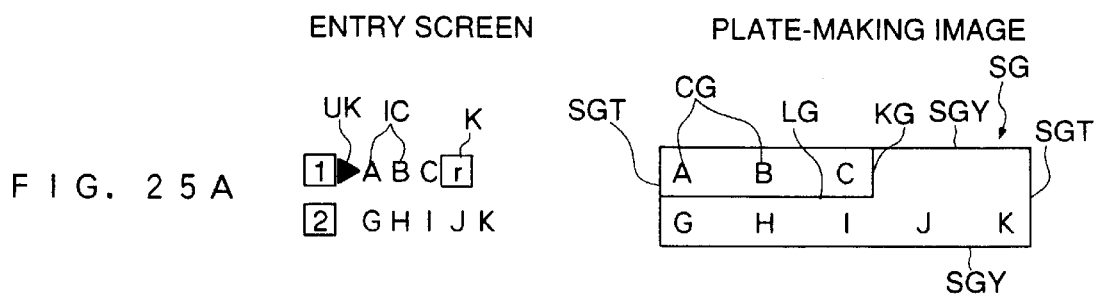
FIGS. 25A to 25C are diagrams similar to FIGS. 24A to 24C, each of which is useful in explaining the third example of the present embodiment.
Figure 25B:
Figure 25C:

FIGS. 25A to 25C are diagrams useful in explaining a layout method employed in the plate-making image-forms process in which stamp characters IC on a first line are set to the "forward alignment" and at the same time the stamp characters IC are set to be underlined. Referring to FIG. 25A, the stamp characters "A B C" on the first line are set to be underlined. In this case, the stamp character image "A" is adjacent to a left-side vertical frame portion SGT of the outer frame SG and the stamp character image "C" to the ruled line character image KG. Hence, in the plate-making image, a string of the stamp character images "A B C" is surrounded by the left-side vertical frame portion SGT of the outer frame SG, part of the upper horizontal frame portion SGY, the underline image LG and the ruled line character image KG.

Further, as shown in FIG. 25B, if the stamp character "D" is entered between the stamp character "C" and the ruled line character KC in FIG. 25A, in the resulting plate-making image, the ruled line character image KG is laid out at a location moved backward and at the same time the newly input stamp character image "D" has an underline image LG drawn through a character area thereof. The stamp character image "D" is adjacent to the ruled line character image KG, and therefore, in accordance with the entry of the stamp character "D", the newly drawn underline image LG has one end thereof (end on a stamp character image "C" side) connected to the underline image LG of the stamp character image "C" and the other end thereof (end on a ruled line character image KG side) connected to the ruled line character image KG. To this end, the image-forming means including underline-drawing means and the underline-extending means according to the invention is comprised of the CPU 301, the ROM 302, the RAM 303 and a program for forming an underline image LG in accordance with the entry of a new stamp character IC.

Further, in the entry and settings shown in FIG. 25C, underline-designating characters UK are entered between the stamp characters "B" and "C" of the stamp characters "A B C D E" on the first line and between the stamp characters "D" and "E" of the same. In this case, the underline-designating character UK on a string tail side (between "D" and "E") sets the completion of the underline designation. Therefore, as shown in a plate-making image of the figure, a string of the stamp character images "C D" is surrounded by the ruled line character images KG, KG located forward and backward of the string, part of the upper horizontal frame portion SGY of the outer frame image SG and the underline image LG.

Figure 26:
FIG. 26 is a diagram of an outer frame having only left-side and right-side vertical frame portions.
Figure 27A:
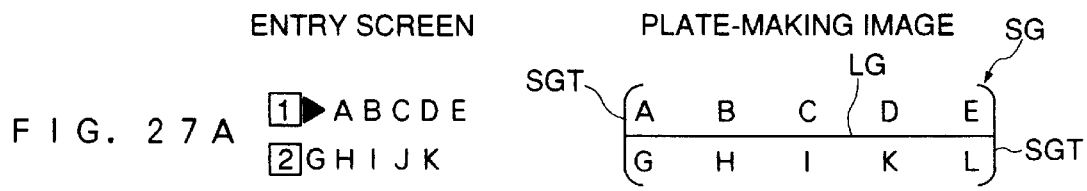
FIGS. 27A and 27B are diagrams similar to FIGS. 24A to 24C, each of which is useful in explaining the third example of the present embodiment.

When an outer frame (outer frame image SG), shown in FIG. 26, is designated, which is comprised of only a pair of vertical frame portions SGT each having upper and lower ends thereof bent inward, if the stamp characters "A B C D E" on a first line are set to be underlined as shown in FIG. 27A, a plate-making image is produced, in which an underline image LG is drawn between the first and second lines and opposite ends thereof are connected respectively to left-side and right-side vertical frame portions SGT of the outer frame SG.

Figure 27B:
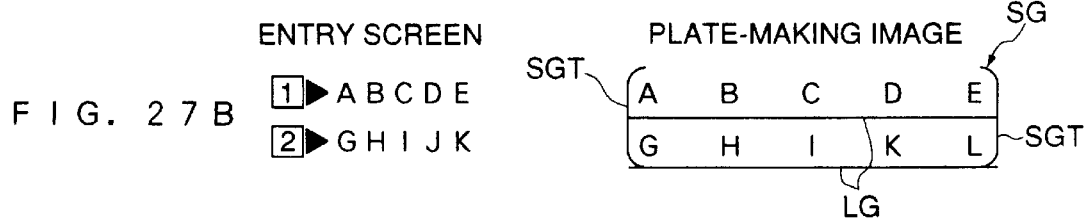
Figure 28:
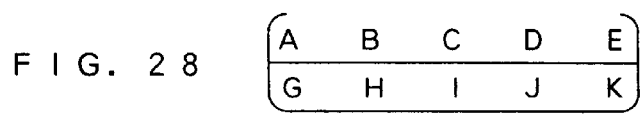
FIG. 28 is a diagram similar to FIGS. 24A to 24C, which is useful in explaining the third example of the present embodiment.

However, as shown in FIG. 27B, if an underline image LG is drawn under the stamp characters "G H I J K" on a second line in the same manner as described above, more specifically, if the underline image LG is drawn with reference to an outermost straight portion of each vertical frame portion SGT, the underline image LG drawn at the second line comes to protrude from each vertical frame portion SGT of the outer frame image SG, as shown in the plate-making image in FIG. 27B. Therefore, in the tape making apparatus 1, when an outer frame (outer frame image), as shown in FIG. 26, is designated and when a stamp character on the lowest one of the lines arranged inside the outer frame is underlined and at the same time each of the opposite ends of the underline image LG is connected to each vertical frame portion SGT of the outer frame image SG, each end of the underline image LG is connected to a lower end of each vertical frame portion SGT with reference to a position of the lower end thereof. This prevents the end of the underline image from protruding from the vertical frame position STG, whereby it is possible to form a plate-making image whose excellent appearance is not spoiled (see FIG. 28).

It should be noted that although in the above example, description has been made only of the case in which an outer frame is designated, ruled line characters may be entered forward and backward of stamp characters without designating the outer frame, while the stamp characters are set to be underlined. In this case, ruled line character images KG located forward and backward of stamp character images CG and an under line image LG perform the same functions as the above-mentioned vertical frame portions SGT and a lower horizontal frame portion SGY of the outer frame image SG, and hence it is possible to freely create a surrounding frame for surrounding the stamp character images CG without being bound by existing frames.

As described above, in the third example, the function of creating underlines is employed, and when underline images LG are drawn through character areas of stamp character images CG adjacent to ruled line character images KG or vertical frame portions SGT of an outer frame image SG, ends of the underline images LG are extended to connect the underline images LG to the ruled line character images KG or the vertical frame portions SGT, which makes it possible to easily form a plate-making image containing various tables or frames surrounding the stamp character images CG, with a high degree of freedom.

Next, by way of a fourth example, a plate-making image-forming process in which stamp characters and a ruled line character are entered on each of a plurality of lines to arrange ruled line character images on respective lines in an aligned manner will be described with reference to FIGS. 29 to 37.

Figure 29:
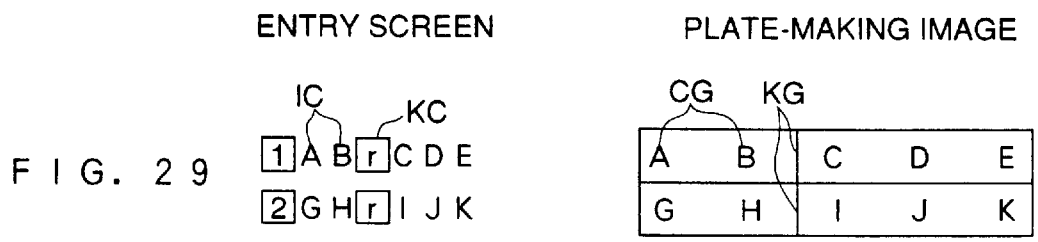
FIG. 29 is a diagram which is useful in explaining a state where ruled line character images on a plurality of lines are aligned.

FIG. 29 shows entry screen in which stamp characters "A B C D E" are entered on a first line with a ruled line character KC between "B" and "C", while stamp characters "G H I J K" are entered on a second line with a ruled line character KC: between "H" and "I", together with a corresponding a plate-making image in which stamp character images CG and a ruled line character image KG on each line are uniformly laid out at equal space intervals. As shown in the figure, when the stamp characters IC are identical in number and size between lines and at the same time the number of stamp characters IC forward of the ruled line character KC: and that of stamp characters backward of the same are identical between the lines, a plate-making image is formed in which the ruled line character images KG on the first and second lines are continuously arranged at an identical position in the direction along the lines, to form a straight line in the vertical direction.

Figure 30A:
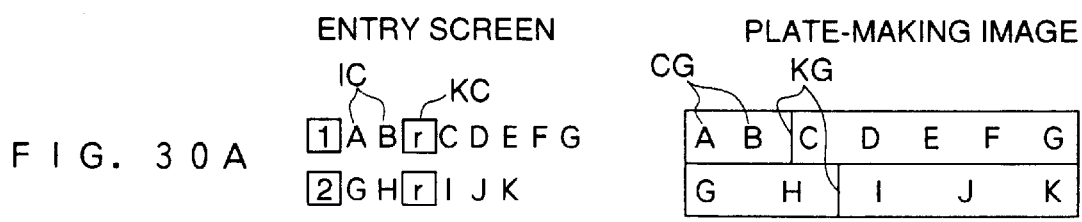
FIGS. 30A to 30C are diagrams, each of which is useful in explaining a state where ruled line character images on a plurality of lines are not aligned.
Figure 30B:
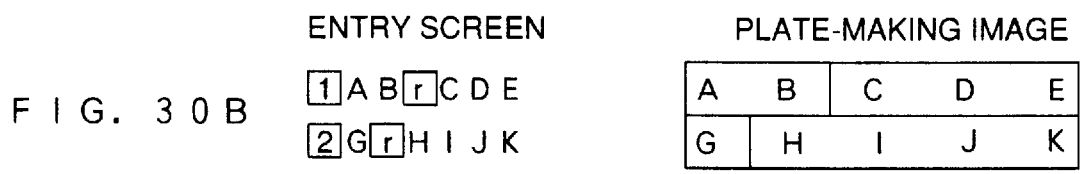
Figure 30C:
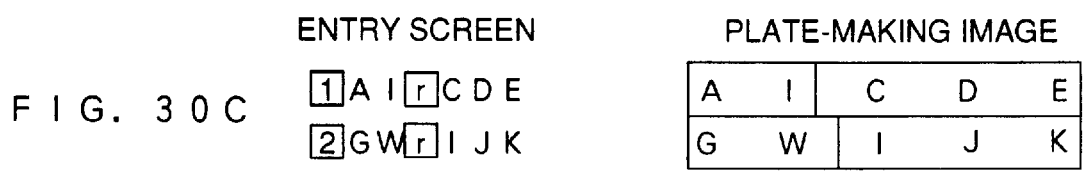

However, as shown in FIG. 30A, when the number of stamp characters IC on a first line is different from that on a second line, and as shown in FIG. 30B, when the number of stamp characters IC forward of a ruled line character KC and the number of stamp characters IC backward of the same are different between the lines, or further as shown in FIG. 30C, when stamp characters with different widths ("I" and "W" in the illustrated example) are mixed, a plate-making image comes is formed in which layout positions of ruled line character images KG on the first and second lines do not coincide with each other, i.e. not aligned.

Figure 31:
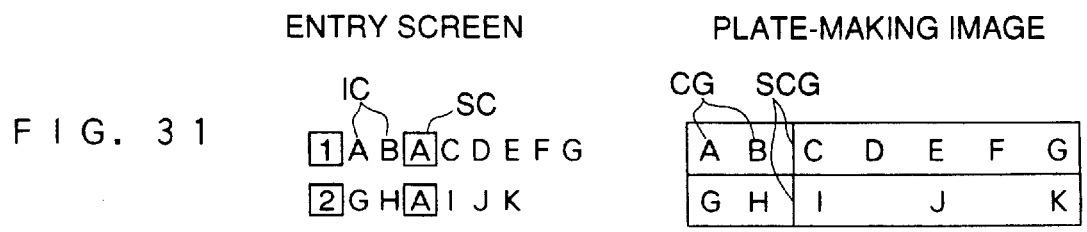
FIG. 31 is a diagram which is useful in explaining a case where aligned ruled line characters are entered as ruled line characters.

To eliminate the above inconvenience, the stamp making apparatus 1 is constructed such that it is possible to enter ruled line characters which enable ruled line character images on respective lines to be arranged in an aligned manner (hereinafter referred to as "aligned ruled line characters"). Therefore, each of a plurality of aligned ruled line characters on respective lines designates a position of a correspondent segment of a ruled line drawn according thereto. FIG. 31 shows a case where aligned ruled line characters SC are entered in place of the ruled line characters in FIG. 30A. As shown in FIG. 31, when each aligned ruled line character SC is entered, the character in the form of "A" in a square box is displayed on the display 24.

Figure 32A:
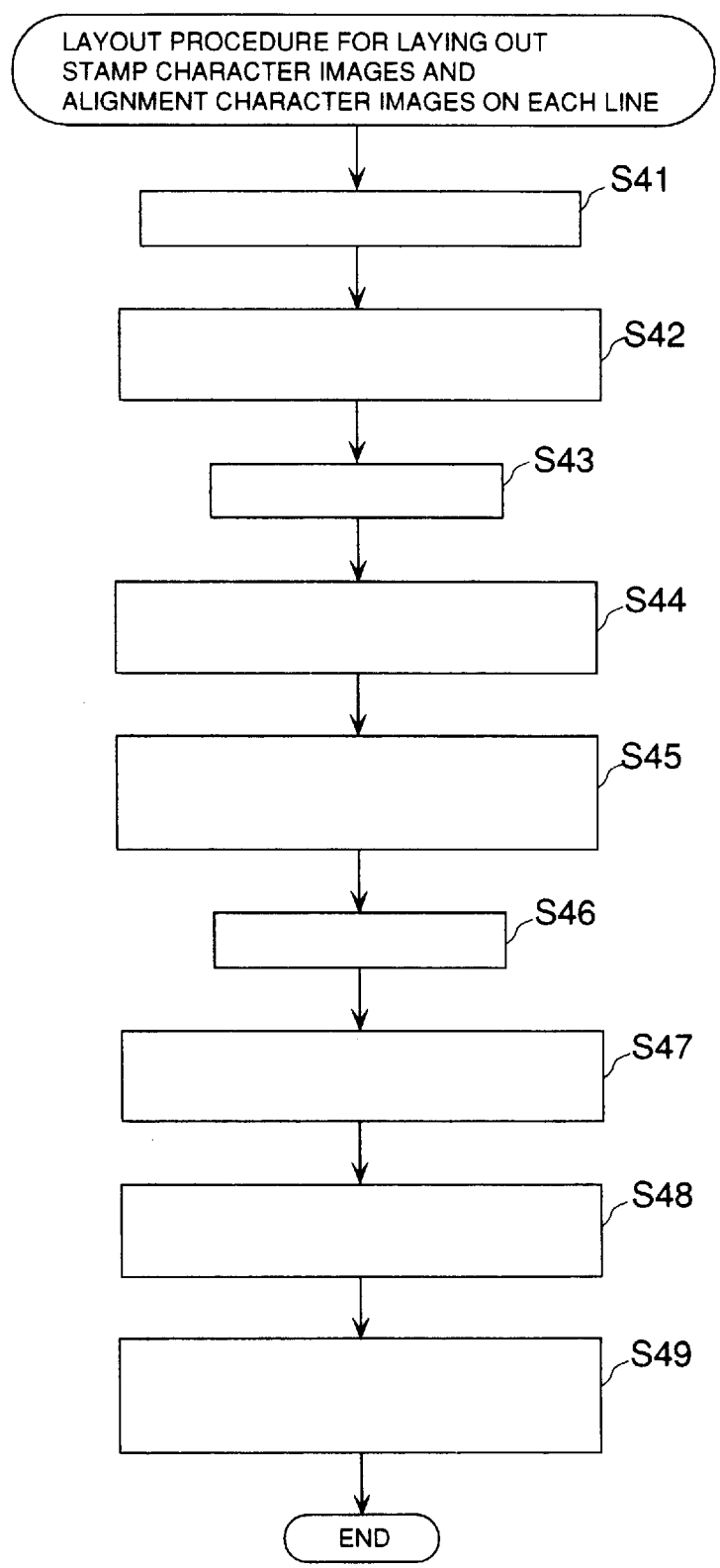
Figure 33A:
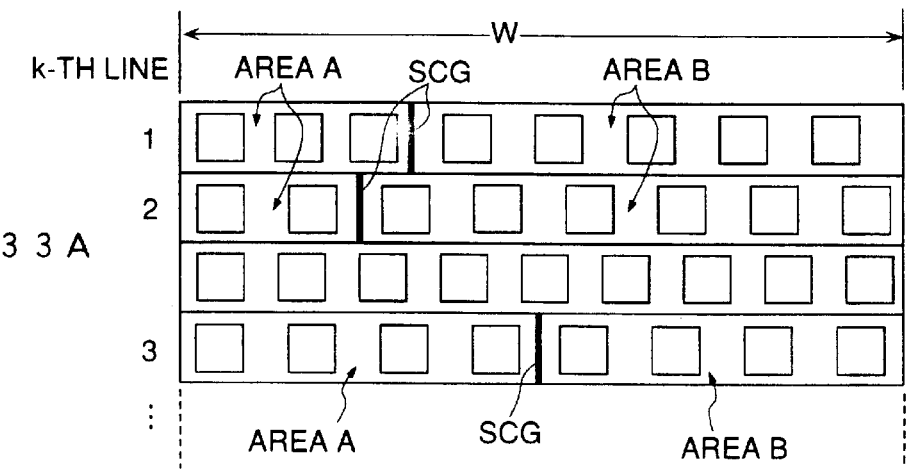
FIGS. 33A and 33B are conceptual representations of image areas of a plate-making image, which are useful in explaining a procedure for laying out stamp character images and aligned ruled line character images.
Figure 33B:
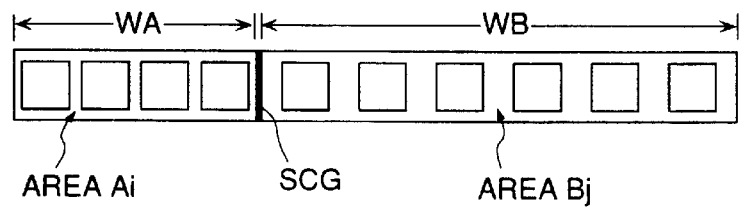

Now, the layout of stamp character images CG and aligned ruled line character images SCG in a plate-making image in the case of aligned ruled line characters SC being entered is generally described. FIGS. 32A and 32B show a procedure up to a layout step for laying out stamp character images CG and aligned ruled line character images SCG on a plurality of lines in an image area R. Further, FIGS. 33A and 33B are conceptual representations of portions (actual and imaginary) of plate-making images which are useful in explaining the above procedure up to the layout step. As shown in FIGS. 33A and 33B, first, each line having an aligned ruled line character thereon is divided into an area forward of the aligned ruled line character and an area backward thereof (hereinafter, the former and the latter are referred to as an "area A" and an "area B", respectively), at step S41. Further, in the following description, an area A and an area B on a k-th line having an aligned ruled line character thereon are represented by Ak and Bk, respectively, and the character length (the character width x the number of characters) of a string of stamp character images CG in the area A and that of a string of stamp character images CG in the area B are represented by LAk and LBk, respectively.

Next, assuming that each stamp character image CG on each line having an aligned ruled line character SC entered thereon is of the minimum character size, all the combinations of "LAi +LBj" (i, j=1, 2, 3, . . . j) are checked to select a combination giving the maximum value of the sum total at step S42. Then, based on the combination of "LAi +LBj" giving the maximum value (hereinafter represented by "LAmax+LBmax"), a character size is determined at step S43. More specifically, first, assuming that the length (area length) of a character image area in the image area R in which stamp character images CG can be laid out is represented by W and the width of an aligned ruled line character SCG by t, a value of a ratio W/(LAmax+LBmax+t) is calculated to multiply the result by a dot number of the minimum character size and the largest one of all the character sizes which are smaller than the resulting value of the multiplication is selected.

Next, by using the character size determined at step S43, the character length (LAi) of a string of stamp character images CG in each of all the areas A and that (LBj) of a string of stamp character images CG in each of all the areas B are calculated at step S44. Thereafter, all the combinations of "LAi+LBj" are checked for selecting a combination of (LAmax+LBmax) giving the maximum value of the sum total "LAi+LBj" at step S45.

In this process, it is preferred that by taking into account a case in which a character size of stamp character images CG is designated by the operator, or a case where stamp character images CG having various character widths are arranged in a mixed manner, a value of "LAi+LBj" (in this case, character sizes obtained by the above calculation is not used) of each combination is subtracted from the area length W to divide the result or difference by a sum total of the number of characters in the area Ai and the number of characters in the area Bj. Then, based on the result or quotient of the division (hereinafter referred to as "the determination parameter"), i.e. spacing between each pair of adjacent characters when stamp character images CG are uniformly laid out, a combination of "LAi+LBj" giving the minimum value of the determination parameter is selected. This is because, when all the stamp characters to be arranged have the same character size (character width), the value of the determination parameter is inversely proportional to a character length (total of widths of stamp character images), whereas when stamp character images CG having various character widths are mixed, if the above selection is carried out based on only whether or not the character length is large, stamp character images CG can be prevented from being uniformly laid out. An example of this problem will be described hereinafter.

Next, assuming that a selected area Ai and a selected area Bj imaginarily exist on an identical line, in other words, assuming that the characters in the area Ai and the characters in the area Bi form a single line, the imaginary line formed by the area Ai and the area Bj is defined as "the layout reference line" at step S46, and similarly to the first example, each stamp character image CG is laid out on the Layout reference line at step S47. This makes it possible, as shown in FIG. 33B, to calculate the area lengths WA, WB of the area A and the area B and determine a position for laying out aligned ruled line character images SCG (hereinafter referred to as "the division position") (S48).

Then, each stamp character image CG is uniformly laid out in areas A and areas B, while aligned ruled line character images SCG are aligned at the division position at step S49. Thus, the layout operation for laying out stamp character images CG and aligned ruled line character images SCG on respective lines is completed. It should be noted that the step characters images CG and the ruled line character image SCG on the layout reference line may be actually arranged at respective positions on the actual lines at step S47. In such case, at step 49, the remaining stamp character images CG and the aligned ruled line character SCG are laid out.

Figure 34A:
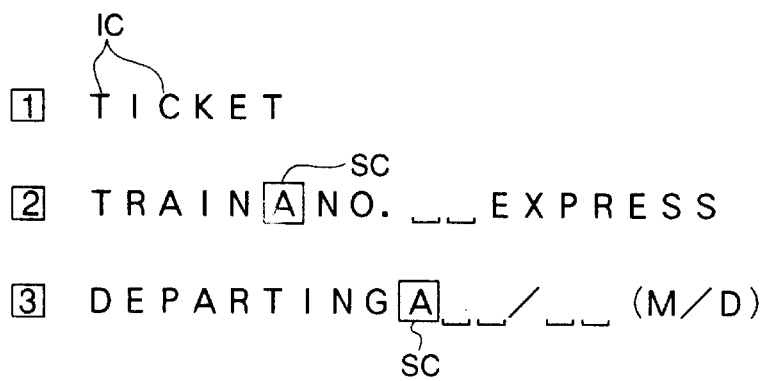
FIG. 34A is a diagram schematically showing stamp characters and aligned ruled line characters entered and displayed on an entry screen, which is useful in specifically explaining a fourth example of the present embodiment.

In the following, the layout operation for laying out stamp character images and aligned ruled line character images on each of a plurality of lines will be described more specifically with reference to FIGS. 34A to 37B. FIG. 34A shows an entry screen in the case of stamp characters "TICKET", "TRAIN NO. EXPRESS" and "DEPARTING/(M/D)" being entered on first, second and third lines, respectively. It should be noted that full-sized spaces for two characters are inserted between the stamp characters "NO." and "EXPRESS" on the second line, between the aligned ruled line character SC and the stamp character "/" on the third line and between the stamp character "/" and the stamp characters "M/D" on the same. In the following, layout procedures for laying out stamp character images CG and aligned ruled line character images SCG in response to the entry of the above stamp characters IC are sequentially described with reference to the FIG. 32A/32B flowchart.

Figure 34B:
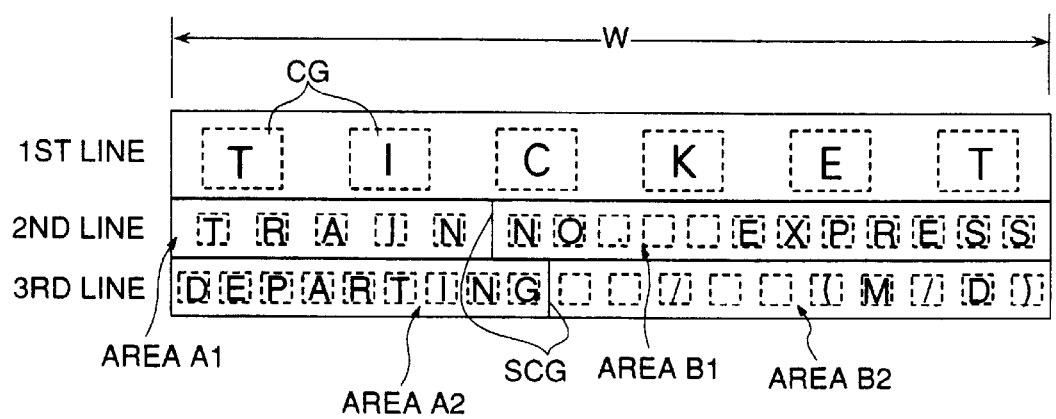
FIG. 34B is a diagram schematically showing an image for describing the fourth example of the present embodiment in detail.
Figure 40A:
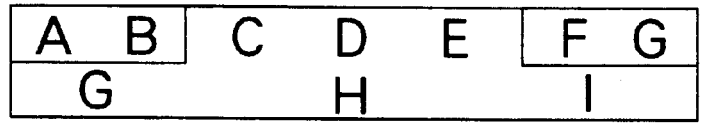
FIGS. 40A and 40B are diagrams, which are useful in explaining a case where preferred underlines are drawn within a ruled line frame by using an underlining function.
Figure 40B:
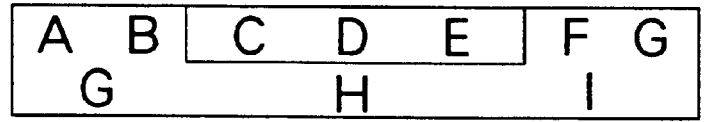
Figure 41A:
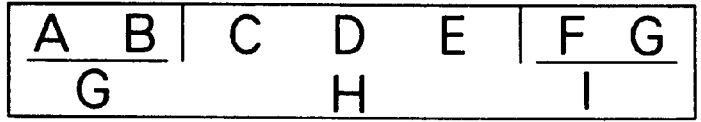
FIGS. 41A and 41B are diagrams, which are useful in explaining a case where horizontal ruled lines are drawn within a ruled line frame by using a conventional underlining function.
Figure 41B:
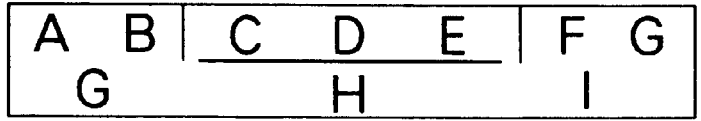

First, areas forward of the aligned ruled line character images SCG on the second and third lines having aligned ruled line characters SC entered thereon are defined as areas A, and areas backward of the aligned ruled line character images SCG on the second and third lines are defined as areas B at step S41. Therefore, as shown in FIG. 34B, areas for laying out the stamp character images CG of "TRAIN" and "NO. EXPRESS" are indicated by an area A1 and an area B1, respectively, whereas areas for laying out the stamp character images CG of "DEPARTING" and "/(M/D)" by an area A2 and an area B2, respectively.

Next, character lengths of the stamp character images CG in the areas A and the areas B on the second and the third lines are calculated to select a combination giving the largest value of the total sum of the character length in the area A and the character length in the area B at step S42. In this process, the calculation is carried out, assuming that the character size of each stamp character image CG is a reduced size of the minimum size S (hereinafter referred to as "reduced S size"), that is, the character width is assumed to be 18 dots (see the above TABLE 1). As a result, a character length LA1 in the area A (area A1) on the second line is 90 (=18×5) dots and a character length LB1 in the area B (area B1) on the second line is 216 (=18×12) dots, whereas a character length LA2 in the area A (area A2) on the third line is 162 (=18×9) dots and a character length LB2 in the area B (area B2) on the third line is 180 (=18×10) dots. Therefore, when the character length in the area A is added to the character length in the area B, the maximum value is given by the combination of LA2 and LB1. The value of LAmax+LBmax is equal to 378 (=162+216) dots. Further, when the width of the aligned ruled line character image is set to e.g. 2 dots and the character image area W to e.g. 570 dots, the value of W/(LAmax+LBmax+t) is equal to 1.5. And, when this value is multiplied by the character width (18 dots) of the above reduced S size, a value of 27 is obtained. As a result, according to the above TABLE 1, the maximum one of the character sizes equal to or smaller than the value of 27 is the size S (height×width: 24×24 dots).

It should be noted that the character length of the stamp character image "TICKET" on the first line is 108 (=18×6) dots, when calculated by using the above size reduced S. Accordingly, when the character image area W (570 dots) is divided by the value, a value of approx. 5.28 is obtained and by multiplying this value by the character width (18 dots) of the size reduce S, a value of 95.04 is obtained. Therefore, the maximum one of the character sizes having widths of 95.04 dots or less, that is, a character size of the size G (normal size) is selected. It should be noted that in a case where if the calculated character size (64×64 dots in the illustrated example) is used, stamp character images CG on the first line are laid out without forming space therebetween, it is preferable that the character size L (48×48 dots) lower by one level is adopted as a character size of the stamp character images CG on the first line.

The character lengths of the stamp character images CG in all the areas A and areas B on the second and third lines are calculated by using the character size S (24×24 dots) determined as described above, at step S44. That is, according to the calculation, the character length LA1 in the area A1 on the second line is equal to 120 (=24×5) dots and the character length LB1 in the area B1 on the same is equal to 288 (=24×12) dots, while the character length LA2 in the area A2 on the third line is equal to 216 (=24×9) dots and the character length LB2 in the area B2 on the same is equal to 240 (24×10) dots. Further, the character length of the stamp character images CG on the first line is equal to 384 (=64×6).

Then, all the combinations of "LA+LB" are checked to select al combination giving the maximum value at step S45. The following TABLE 2 shows values of all combinations "LA+LB" selected from all the character lengths in the areas A and all the character lengths in the areas B. Further, in the values of "LA+LB" shown in the TABLE 2 is included the width (2 dots) of the aligned ruled line character image.

TABLE 2

| Combination | LA + LB (Dots) | Character Number | Determination Parameter |
| --- | --- | --- | --- |
| A1 + B1 | 410 | 17 | 9.4 |
| A1 + B2 | 362 | 15 | 13.9 |
| A2 + B1 | 506 | 21 | 3.0 |
| A2 + B2 | 458 | 19 | 5.9 |

As clearly shown in the TABLE 2, the combination of "LA+LB" giving the largest value is a combination of the area A2 on the third line and the area B1 on the second line. Determination parameters in respective combinations are shown in the TABLE 2. In this embodiment, since the calculation is carried out, assuming that the character sizes of the stamp character images CG on the second and third lines are identical to each other, a combination giving the minimum determination parameter coincides with the combination (A2+B1) giving the largest character length.

Now, for instance, when in a character image area having an area length of 234 dots, stamp character images of "IIIIIIII" (eight characters) are laid out on a first line and stamp character images of "WWWW" (four characters) are laid out on a second line, if the character width of "I" is 20 dots and that of "W" is 43 dots, the character length on the first line becomes equal to 160 (=20×8) dots, whereas the character length on the second line becomes equal to 172 (=43×4). In this case, if a line having the maximum character length, i.e. the second line is set to the above-mentioned layout reference line to calculate an inter-character distance based on the layout reference line, the calculated value of the inter-character distance is equal to 15 ($\approx$(234−172)/4) dots. When the stamp character images on the first line are uniformly laid out by using the value, the character length including the inter-character distance becomes equal to 265 (=20+15+20+15+20+15+20+15+20+15+20+15+20+15+20) dots (margins forward and backward of the stamp character images are omitted), which exceeds 234 dots of the area length W, as shown in FIG. 35A.

On the other hand, when a determination parameter for each line is calculated in the above case, one for the first line becomes equal to 9.25 (=(234−160)/8), whereas one for the second line is calculated to be 15.5(=(234'172)4). Now, if a line having the minimum determination parameter, i.e. the first line is set to the layout reference line to calculate the inter-character distance based on the layout reference line, the obtained value of the inter-character distance becomes equal to 9 ($\approx$(234−160)/8) dots, which makes it possible to lay out all the stamp character images on the first and second lines with the predetermined character image area. Therefore, with reference to determination parameters, a combination giving the minimum value of the determination parameters is selected, whereby even when stamp character images having various character widths are arranged in a mixed manner, it becomes possible to select a suitable combination of an area A and an area B of which a layout reference line should be formed.

Assuming that the area A2 and the area B1, selected as described above, imaginarily exist on an identical line, a line formed by the area A2 and the area B1 is defined as "the layout reference line" at step S46 and similarly to the above first example, each stamp character image CG is laid out on the layout reference line at step S47.

That is, the inter-character distance b between the stamp character images is equal to 3 (=(570−506)/21) and each of the forward and backward margins d located forward and backward of the stamp character images is equal to 1 (=3÷2) dots. However, remainders can be left by the calculation of the inter-character distance b, and the margins d and d1, as can be understood from the above example. In such cases, one dot from the remainders is sequentially added to values of the inter-character distance at respective positions from the string head side. This makes it possible to lay out each stamp character image on the layout reference line as shown in FIG. 36. Further, respective numerals written under the character string represent dot numbers of the inter-character distances b between the stamp character images, the forward and backward margins d and forward and backward margins d1 located forward and backward of the aligned ruled line character image SCG.

Based on the result of the above layout, the area lengths WA, WB of the area A and the area B are calculated and at the same time a division position for laying out the aligned ruled line character image SCG is determined at step S48. More specifically, the area length WA becomes equal to 245 (=1+24+4+24+4+24+4+24+3+24+3+24+3+24+3+24+3+24+1) dots, and the area length WB becomes equal to 323 (=1+24+3+24+3+24+3+24+3+24+3+24+3+24+3+24+3+24+3+24+3+24+1) dots. This causes the division position of the aligned ruled line character image SCG to be set at a location 245 dots from a forward end of the character image area.

In the other areas than the area A2 and the area B1 constructing the layout reference line, that is, in the area A1 and the area B2, stamp character images are uniformly laid out, similarly to the first example, while the aligned ruled line character images SCG on the second and third lines are aligned at the above division position at step S49, and further the stamp character images on the first line are also uniformly laid out, similarly to the first example, whereby a plate-making image appearing in FIG. 37A is produced.

It should be noted that although the stamp character images are uniformly laid out in the above embodiment, this is not limitative, but it is possible to lay out the same by the "forward alignment layout method", the "center alignment layout method" and the "backward alignment layout method", as described hereinbefore. FIG. 37B shows a plate-making image in which stamp character images on second and third lines are laid out by the forward alignment layout method.

As described above, according to the fourth example, even when ruled line characters moving along a character string in response to the entry or deletion of stamp characters are arranged on a plurality of lines, it is possible to easily align the ruled line character images (aligned ruled line character images) in the vertical direction to thereby form an attractive plate-making image.

It should be noted that although in the above embodiment, description has been made of the case in which the image-forming method and device and the electronic apparatus incorporating the device, according to the invention, are applied to a stamp making apparatus, this is not limitative, but it does without saying that the same can be applied to a tape printing apparatus and a word processor.

It is further understood by those skilled in the art that the foregoing are preferred embodiments of the invention, and that various changes and modification may be made without departing from the spirit and scope thereof.

What is claimed is:

1. A method of forming an image, comprising the steps of:
    inputting at least one line of a character string by using letter/symbol characters respectively representative of characters including letters, symbols and a space, and a ruled line character representative of a character which designates, by its position in said character string, a position where a ruled line should be drawn in a manner connectable to other ruled lines, the ruled line character having the same character size as that of each of said letter/symbol characters and being processed on a display screen in the same way that said letter/symbol characters are processed; and
    forming, with control apparatus, an image including images of said characters represented respectively by said letter/symbol characters, and an image of said ruled line drawn at said position.

2. A method according to claim 1, wherein the step of forming said image includes drawing, with control apparatus, said ruled line in a manner such that said ruled line reaches an adjacent one of said other ruled lines.

3. A method according to claim 1, including the step of displaying said ruled line character on a display screen in a manner such that said ruled line character has the same width as each of said letter/symbol characters and that said ruled line character can be handled similarly to said each of said letter/symbol characters; and
    wherein the step of forming said image includes drawing, with control apparatus said ruled line in a manner such that a segment of said ruled line corresponds to said ruled line character.

4. A method according to claim 1, wherein said image including said images of said characters and said image of said ruled line is a print image that can be displayed on a display screen and be used for printing.

5. A method according to claim 1, wherein said ruled line character is an aligned ruled line character which designates said position of said ruled line in a manner such that segments of said ruled line on different lines are aligned in a line;
    the step of inputting said at least one line of said character string including inputting each of a plurality of lines of said letter/symbol characters for a character image area having a fixed length, and said aligned ruled line character to at least two different lines of said plurality of lines;
    the step of forming said image including drawing, with control apparatus, said segments of said ruled line at said at least two different lines, in a manner such that said segments of said ruled line are aligned to form a straight line.

6. A method according to claim 5, wherein the step of forming said image includes the steps of:
    selecting, with control apparatus, from all possible combinations of a string of all letter/symbol characters on a string head side of said aligned ruled line character on each of said at least two different lines and a string of all letter/symbol characters on a string tail side of said aligned ruled line character on each of said at least two different lines, a combination which gives a minimum spacing between each pair of adjacent characters assuming that all characters represented by the selected combination are uniformly laid out in said character image area;
    carrying out, with control apparatus, imaginary uniform layout of said all characters represented by the selected combination and said ruled line in said character image area; and
    drawing, with control apparatus, segments of said ruled line each corresponding to said aligned ruled line character input in said each of said at least two different lines, at said position of said ruled line determined by a result of said imaginary uniform layout, in an aligned manner to form a straight line.

7. A method according to claim 5, wherein the step of forming said image includes the steps of:
    selecting, with control apparatus, from all possible combinations of a string of all letter/symbol characters on a string head side of said aligned ruled line character on each of said at least two different lines and a string of all letter/symbol characters on a string tail side of said aligned ruled line character on each of said at least two different lines, a combination which gives a largest sum total of character lengths;
    carrying out, with control apparatus, imaginary uniform layout of all characters represented by the selected combination and said ruled line in said character image area; and
    drawing, with control apparatus, segments of said ruled line each corresponding to said aligned ruled line character input in said each of said at least two different lines, at said position of said ruled line determined by a result of said imaginary uniform layout, in an aligned manner to form a straight line.

8. A method according to claim 6 or 7, wherein the step of forming said image includes providing, with control apparatus, spacing between said ruled line and a character adjacent thereto in a manner such that said spacing is smaller than spacing between each pair of adjacent characters.

9. A method according to claim 6 or 7, wherein the step of forming said image further includes uniformly, with control apparatus, laying out images of characters represented by said string of said all letter/symbol characters on said string head side in a string head-side portion of said character image area and images of characters represented by said string of said all letter/symbol characters on said string tail side in a string tail-side portion of said character image area, said ruled line dividing said character image area into said string head-side portion and said string tail-side portion.

10. A method according to claim 1, wherein the step of inputting said at least one line of said character string includes inputting said letter/symbol characters, and a pair of ruled line characters on an identical line, for designating positions where respective ruled lines should be drawn in relation to each other in a manner defining therebetween a range of at least one of said letter/symbol characters input.

11. A method according to claim 10, wherein the step of inputting said at least one line of said character string includes:
   shifting a string tail-side one of said pair of ruled line characters toward a string tail by a distance corresponding to at least one letter/symbol character added between said pair of ruled line characters; or
   shifting said string tail-side one of said pair of ruled line characters toward a string head by a distance corresponding to at least one letter/symbol character deleted from between said pair of ruled line characters; and
   wherein the step of forming said image includes drawing, with control apparatus, one of said ruled lines at a position shifted according to the shift in position of said string tail-side one of said pair of ruled line characters.

12. A method according to claim 10 or 11, wherein the step of forming said image includes the step of connecting, with control apparatus, between upper ends of segments of a pair of said ruled lines designated respectively by said ruled line characters and between lower ends of said segments, by a pair of connection ruled lines.

13. A method according to claim 12, wherein the step of forming said image includes:
   extending, with control apparatus, each of said pair of connection ruled lines toward a string tail by a distance corresponding to at least one letter/symbol character added, to thereby connect said pair of connection ruled lines to said pair of ruled lines, when said at least one letter/symbol character is added between said pair of ruled line characters; and
   contracting, with control apparatus, said each of said pair of connection ruled lines toward a string head by a distance corresponding to at least one letter/symbol character deleted, to thereby connect said pair of connection ruled lines to said pair of ruled lines, when said at least one letter/symbol character is deleted from between said pair of ruled line characters.

14. A method according to claim 1, wherein the step of inputting said at least one line of said character string includes inputting a plurality of letter/symbol characters and said ruled line character in a manner such that said ruled line character divides said plurality of letter/symbol characters at a desired position, for an character image area having a fixed length; and
   wherein the step of forming said image includes uniformly laying out, with control apparatus, images of said characters in said character image area, and drawing said ruled line at said position designated by said ruled line character according to the result of the layout of said characters.

15. A method according to claim 14, wherein the step of inputting said at least one line of said character string includes adding at least one letter/symbol character to said plurality of letter/symbol characters input or deleting at least one letter/symbol character from said plurality of letter/symbol characters input; and
   wherein the step of forming said image includes uniformly laying out, with control apparatus, all of images of characters represented by the resulting letter/symbol characters in said character image area, and drawing said ruled line at said position designated by said ruled line character according to the result of the layout of said characters.

16. A method according to claim 1, wherein the step of inputting said at least one line of said character string includes inputting a plurality of letter/symbol characters, and said ruled line character, in a manner such that said ruled line character divides said plurality of letter/symbol characters at a desired position, for an character image area having a fixed length; and
   wherein the step of forming said image includes changing, with control apparatus, a size of each of images of said characters represented by said plurality of letter/symbol characters in a manner such that all of said images of said characters are fitted within said character image area, and drawing said ruled line within said character image area at said position designated by said ruled line character in a manner dependent on the result of the change of said size of said each of said images of said characters.

17. A method according to claim 1, wherein the step of inputting said at least one line of said character string includes designating provision of an underline for at least one letter/symbol character adjacent to said ruled line character; and
   wherein the step of forming said image includes extending, with control apparatus, a ruled line-side end of said underline to thereby connect said underline with said ruled line.

18. A method to claim 17, wherein the step of inputting said at least one line of said character string includes adding at least one letter symbol/character to said at least one letter/symbol character for which said provision of said underline is designated; and
   wherein the step of forming said image including drawing, with control apparatus, said underline for an image of each of said at least one letter/symbol character added.

19. A method according to claim 17, wherein a segment of said ruled line corresponding to said ruled line character forms part of a frame enclosing said letter/symbol characters.

20. An image-forming device comprising:
   input means for inputting at least one line of a character string by using letter/symbol characters respectively representative of characters including letters, symbols and a space, and ruled line character representative of a character which designates, by its position in said character string, a position where a ruled line should be drawn in a manner connectable to other ruled lines, the ruled line character having the same character size as that of each of said letter/symbol characters and being processed on a display screen in the same way that said letter/symbol characters are processed; and
   image-forming means for forming an image including images of said characters represented respectively by said letter/symbol characters, and an image of said ruled line drawn at said position.

21. An image-forming device according to claim 20, wherein said image-forming means further comprises means for drawing said ruled line in a manner such that said ruled line reaches an adjacent one of said other ruled lines.

22. An image-forming device according to claim 20, including display means for displaying said ruled line character on a display screen in a manner such that said ruled line character has the same width as each of said letter/symbol characters and that said ruled line character can be handled similarly to said each of said letter/symbol characters; and wherein said image-forming means further comprises means for drawing said ruled line in a manner such that a segment of said ruled line corresponds to said ruled line character.

23. An image-forming device according to claim 20, wherein said image including said images of said characters and said image of said ruled line is a print image that can be displayed on a display screen and be used for printing.

24. An image-forming device according to claim 20, wherein said ruled line character is an aligned ruled line character which designates said position of said ruled line in a manner such that segments of said ruled line on different lines are aligned in a line;

said input means inputting each of a plurality of lines of said letter/symbol characters for a character image area having a fixed length, and said aligned ruled line character to at least two different lines of said plurality of lines;

said image-forming means drawing said segments of said ruled line at said at least two different lines, in a manner such that said segments of said ruled line are aligned to form a straight line.

25. An image-forming device according to claim 24, wherein said image-forming means includes:

combination-selecting means for selecting from all possible combinations of a string of all letter/symbol characters on a string head side of said aligned ruled line character on each of said at least two different lines and a string of all letter/symbol characters on a string tail side of said aligned ruled line character on each of said at least two different lines, a combination which gives a minimum spacing between each pair of adjacent characters assuming that all characters represented by the selected combination are uniformly laid out in said character image area;

imaginary layout means for carrying out imaginary uniform layout of said all characters represented by the selected combination and said ruled line in said character image area; and aligned ruled line-drawing means for drawing segments of said ruled line each corresponding to said aligned ruled line character input in said each of said at least two different lines, at said position of said ruled line determined by a result of said imaginary uniform layout, in an aligned manner to form a straight line.

26. An image-forming device according to claim 24, wherein said image-forming means includes:

combination-selecting means for selecting from all possible combinations of a string of all letter/symbol characters on a string head side of said aligned ruled line character on each of said at least two different lines and a string of all letter/symbol characters on a string tail side of said aligned ruled line character on each of said at least two different lines, a combination which gives a largest sum total of character lengths;

imaginary layout means for carrying out imaginary uniform layout of all characters represented by the selected combination and said ruled line in said character image area; and aligned ruled line-drawing means for drawing segments of said ruled line each corresponding to said aligned ruled line character input in said each of said at least two different lines, at said position of said ruled line determined by a result of said imaginary uniform layout, in an aligned manner to form a straight line.

27. An image-forming device according to claim 25 or 26, wherein said image-forming means further comprises means for providing spacing between said ruled line and a character adjacent thereto in a manner such that said spacing is smaller than spacing between each pair of adjacent characters.

28. An image-forming device according to claim 25 or 26, wherein said image-forming means includes uniform layout means for uniformly laying out images of characters represented by said string of said all letter/symbol characters on said string head side in a string head-side portion of said character image area and images of characters represented by said string of said all letter/symbol characters on said string tail side in a string tail-side portion of said character image area, said ruled line dividing said character image area into said string head-side portion and said string tail-side portion.

29. An image-forming device according to claim 20, wherein said input means inputs said letter/symbol characters, and a pair of ruled line characters on an identical line, for designating positions where respective ruled lines should be drawn in relation to each other in a manner defining therebetween a range of at least one of said letter/symbol characters input.

30. An image-forming device according to claim 29, wherein said input means includes shifting means for shifting a string tail-side one of said pair of ruled line characters toward a string tail by a distance corresponding to at least one letter/symbol character added between said pair of ruled line characters, or shifting said string tail-side one of said pair of ruled line characters toward a string head by a distance corresponding to at least one letter/symbol character deleted from between said pair of ruled line characters; and wherein said image-forming means further comprises means for drawing one of said ruled lines at a position shifted according to the shift in position of said string tail-side one of said pair of ruled line characters.

31. An image-forming device according to claim 29 or 30, wherein said image-forming means includes connecting means for connecting between upper ends of segments of a pair of said ruled lines designated respectively by said ruled line characters and between lower ends of said segments, by a pair of connection ruled lines.

32. An image-forming device according to claim 31, wherein said image-forming means further comprises means for causing said connecting means to extend each of said pair of connection ruled lines toward a string tail by a distance corresponding to at least one letter/symbol character added, to thereby connect said pair of connection ruled lines to said pair of ruled lines, when said at least one letter/symbol character is added between said pair of ruled line characters, and contract said each of said pair of connection ruled lines toward a string head by a distance corresponding to at least one letter/symbol character deleted, to thereby connect said pair of connection ruled lines to said pair of ruled lines, when said at least one letter/symbol character is deleted from between said pair of ruled line characters.

33. An image-forming device according to claim 20, wherein said input means further comprises means for inputting a plurality of letter/symbol characters and said ruled line character in a manner such that said ruled line character divides said plurality of letter/symbol characters at a desired position, for an character image area having a fixed length; and wherein said image-forming means includes uniform layout means for uniformly laying out images of said characters in said character image area, and ruled line character-drawing means for drawing said ruled line at said position designated by said ruled line character according to the result of the layout of said characters.

34. An image-forming device according to claim 33, wherein said input means includes adding means for adding at least one letter/symbol character to said plurality of letter/symbol characters input and deleting means for deleting at least one letter/symbol character from said plurality of letter/symbol characters input; and wherein said image-forming means includes uniform layout means for uniformly laying out all of images of characters represented by the resulting letter/symbol characters in said character image area, and ruled line-drawing means for drawing said ruled line at said position designated by said ruled line character according to the result of the layout of said characters.

35. An image-forming device according to claim 20, wherein said input means further comprises means for inputting a plurality of letter/symbol characters, and said ruled line character in a manner such that said ruled line character divides said plurality of letter/symbol characters at a desired position, for an character image area having a fixed length; and wherein said image-forming means includes character size-changing means for changing a size of each of images of said characters represented by said plurality of letter/symbol characters in a manner such that all of said images of said characters are fitted within said character image area, and ruled line-drawing means for drawing said ruled line within said character image area at said position designated by said ruled line character in a manner dependent on the result of the change of said size of said each of said images of said characters.

36. An image-forming device according to claim 20, wherein said input means includes underline-designating means for designating provision of an underline for at least one letter/symbol character adjacent to said ruled line character; and wherein said image-forming means includes underline-drawing means for drawing said underline for an image of each of at least one character represented by said at least one letter/symbol character, and underline-extending means for extending a ruled line-side end of said underline to thereby connect said underline with said ruled line.

37. An image-forming device to claim 36, wherein said input means includes adding means for adding at least one letter symbol/character to said at least one letter/symbol character for which said provision of said underline is designated; and wherein said image-forming means further comprises means for causing said underline-drawing means to draw said underline for an image of each of said at least one letter/symbol character added.

38. An image-forming device according to claim 36, wherein a segment of said ruled line corresponding to said ruled line character forms part of a frame enclosing said letter/symbol characters.

39. An electronic apparatus comprising:

an image-forming device, said image-forming device comprising:

input means for inputting at least one line of a character string by using letter/symbol characters respectively representative of characters including letters, symbols and a space, and a ruled line character representative of a character which designates, by its position in said character string, a position where a ruled line should be drawn in a manner connectable to other ruled lines, the ruled line character having the same character size as that of each of said letter/symbol characters and being processed on a display screen in the same way that said letter/symbol characters are processed; and image-forming means for forming an image including images of said characters represented respectively by said letter/symbol characters, and an image of said ruled line drawn at said position; and a printing device which is capable of printing said image formed by said image-forming device.

\* \* \* \* \*